(12) United States Patent
Shulman et al.

(10) Patent No.: US 11,533,295 B2
(45) Date of Patent: *Dec. 20, 2022

(54) TECHNIQUES FOR SECURELY DETECTING COMPROMISES OF ENTERPRISE END STATIONS UTILIZING TUNNEL TOKENS

(71) Applicant: Imperva, Inc., Redwood City, CA (US)

(72) Inventors: Amichai Shulman, Tel Aviv (IL); Sagie Dulce, Hod HaSharon (IL); Daniella Goihman-Shuster, Rishon LeZion (IL); Shahar Ben-Hador, Sunnyvale, CA (US)

(73) Assignee: Imperva, Inc., San Mateo, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/730,768

(22) Filed: Dec. 30, 2019

(65) Prior Publication Data

US 2020/0137026 A1 Apr. 30, 2020

Related U.S. Application Data

(63) Continuation of application No. 15/187,657, filed on Jun. 20, 2016, now Pat. No. 10,567,342.

(Continued)

(51) Int. Cl.
*H04L 9/40* (2022.01)
*H04L 12/46* (2006.01)
(Continued)

(52) U.S. Cl.
CPC ...... *H04L 63/0245* (2013.01); *H04L 12/4633* (2013.01); *H04L 45/745* (2013.01);
(Continued)

(58) Field of Classification Search
CPC combination set(s) only.
See application file for complete search history.

(56) References Cited

U.S. PATENT DOCUMENTS 6,473,863 B1 * 10/2002 Genty ................. H04L 63/1466
726/4
9,553,886 B2 * 1/2017 Touboul ................. G06F 21/55
(Continued)

FOREIGN PATENT DOCUMENTS

EP 2541861 A1 * 1/2013 ......... H04L 63/1441
EP 2541861 A1 1/2013

OTHER PUBLICATIONS

"TopSpin—White Paper—What is an Insider Threat?," Jul. 1, 2016, 4 pages, TopSpin Security, downloaded from http://www.topspinsec.eom/wp-content/uploads/2015/06/TopSpin_White-Paper_WhatIsInsiderThreat_20160701.pdf on Jan. 5, 2016.‡

(Continued)

*Primary Examiner* — Trang T Doan
(74) *Attorney, Agent, or Firm* — Nicholson, De Vos, Webster & Elliott, LLP

(57) ABSTRACT

A method in a cloud network to detect compromises within an enterprise network based on tokens tunneled outside of the enterprise network to the cloud network. The method includes receiving, at a tunnel gateway server within the cloud network, a first set of packets via a tunnel across a public network from a first server within the enterprise network, where the first set of packets were generated responsive to the first server receiving a second set of packets that originated from within the enterprise network and that included data and a source enterprise network address, where the first set of packets does not include the source enterprise network address and the data includes a token. The method further includes transmitting, by the tunnel gateway server, the data within a third set of packets to a second server that acts as if it were an enterprise server within the enterprise network.

19 Claims, 11 Drawing Sheets

Related U.S. Application Data

(60) Provisional application No. 62/299,472, filed on Feb. 24, 2016.

(51) Int. Cl.

| | | |
|---|---|---|
| *H04L 45/745* | (2022.01) | |
| *H04L 61/5007* | (2022.01) | |
| *H04L 61/2514* | (2022.01) | |
| *H04L 61/103* | (2022.01) | |

(52) U.S. Cl.
CPC ........ *H04L 61/5007* (2022.05); *H04L 63/029* (2013.01); *H04L 63/0281* (2013.01); *H04L 63/1408* (2013.01); *H04L 63/1416* (2013.01); *H04L 61/103* (2013.01); *H04L 61/2514* (2013.01)

(56) References Cited

U.S. PATENT DOCUMENTS

| | | | | |
|---|---|---|---|---|
| 10,447,710 | B1* | 10/2019 | Li | H04L 63/0209 |
| 2002/0004635 | A1‡ | 4/2002 | Takemori | G06F 21/55 |
| | | | | 726/23 |
| 2002/0046351 | A1* | 4/2002 | Takemori | H04L 63/1441 |
| | | | | 726/23 |
| 2004/0078592 | A1* | 4/2004 | Fagone | H04L 63/14 |
| | | | | 726/22 |
| 2007/0271309 | A1* | 11/2007 | Witriol | H04L 67/1095 |
| 2012/0311691 | A1* | 12/2012 | Karlin | H04L 63/0281 |
| | | | | 726/12 |
| 2014/0096229 | A1* | 4/2014 | Burns | H04L 63/1491 |
| | | | | 726/11 |
| 2015/0009833 | A1* | 1/2015 | Pavlovski | H04W 8/26 |
| | | | | 370/241 |
| 2015/0013006 | A1* | 1/2015 | Shulman | H04L 63/1416 |
| | | | | 726/23 |
| 2015/0295943 | A1* | 10/2015 | Malachi | H04L 63/1491 |
| | | | | 726/24 |

OTHER PUBLICATIONS

David Hunt, "Cyber Security 101: An Introduction to Deceptive Technology," Nov. 4, 2015, 9 pages, illusive networks, downloaded from http://blog.illusivenetworks.com/-deceptive-technology-introduction on Jan. 5, 2016.‡

"Solutions—TopSpin," 2016, 6 pages, TopSpin Security, Ltd., downloaded from http://www.topspinsec.com/solutions/ on Jan. 5, 2016.‡

"TopSpin—White Paper—The Art of Decoy and Honeypotting," Jul. 2, 2015, 10 pages, TopSpin Security, downloaded from http://www.topspinsec.com/wp-content/uploads/2015/06/TopSpin_white-paper_The_Art_of_Decoy_and_Honeypotting_20150702.pdf on Jan. 5, 2016.‡

"TopSpin—White paper—Detection vs. Prevention," Jul. 2, 2015, TopSpin Security, downloaded from http://www.topspinsec.com/wp-content/uploads/2015/06/TopSpin_White_paper_Detection-vs-Prevention_20150702.pdf on Jan. 5, 2016.‡

"TopSpin—White Paper—The Right Detection," Jul. 11, 2015, 7 pages, TopSpin Security, downloaded from http://www.topspinsec.com/wp-content/uploads/2015/06/TopSpin_white_paper_The_Right_Detection_201507111.pdf on Jan. 5, 2016.‡

Fielding R., et al., "Hypertext Transfer Protocol—HTTP/1.1," Network Working Group, Request for Comments 2616, The Internet Society, Jun. 1999, 114 pages.‡

Final Office Action from U.S. Appl. No. 15/187,657, dated Dec. 11, 2018, 16 pages.

Non-Final Office Action from U.S. Appl. No. 15/187,657, dated Jun. 4, 2018, 22 pages.

Notice of Allowance from U.S. Appl. No. 15/187,657, dated Feb. 27, 2019, 9 pages.

Notice of Allowance from U.S. Appl. No. 15/187,657, dated Oct. 29, 2019, 7 pages.

TopSpin—White Paper—What is an Insider Threat?, Jul. 1, 2016, 4 pages, TopSpin Security, downloaded from http://www.topspinsec.com/wp-content/uploads/2015/06/TopSpin_White-Paper_WhatIsInsiderThreat_20160701.pdf on Jan. 5, 2016.

\* cited by examiner

‡ imported from a related application

```
┌──────────────────────────────────────────────────────────────────────────────┐
│ RECEIVE (AT A FIRST SERVER THAT IS WITHIN AN ENTERPRISE NETWORK AND THAT IS  │  800
│ IMPLEMENTED BY ONE OR MORE ELECTRONIC DEVICES) A FIRST SET OF ONE OR MORE    │
│ PACKETS FROM A SOURCE ENTERPRISE NETWORK ADDRESS DIRECTED TO A DESTINATION   │
│ ENTERPRISE NETWORK ADDRESS OF THE ENTERPRISE NETWORK, WHEREIN THE            │
│ DESTINATION ENTERPRISE NETWORK ADDRESS IS AN ENTERPRISE NETWORK ADDRESS      │
│ ASSIGNED TO THE FIRST SERVER, WHEREIN THE FIRST SET OF PACKETS INCLUDES      │
│ DATA COMPRISING A TOKEN, WHEREIN THE TOKEN WAS PLACED UPON AN ENTERPRISE     │
│ END STATION WITHIN THE ENTERPRISE NETWORK AND WHEREIN THE TOKEN APPEARS      │
│ TO BE USEFUL FOR ACCESSING THE FIRST SERVER OR A RESOURCE PROVIDED BY THE    │
│ FIRST SERVER 805                                                             │
└──────────────────────────────────────────────────────────────────────────────┘
                                      │
                                      ▼
┌──────────────────────────────────────────────────────────────────────────────┐
│ TRANSMIT A SECOND SET OF ONE OR MORE PACKETS VIA A TUNNEL ACROSS A PUBLIC    │
│ NETWORK TO A SECOND SERVER THAT IS OUTSIDE OF THE ENTERPRISE NETWORK,        │
│ WHEREIN THE SECOND SET OF PACKETS INCLUDES THE DATA AND AN IDENTIFIER BUT    │
│ DOES NOT INCLUDE THE SOURCE ENTERPRISE NETWORK ADDRESS SO THAT THE SOURCE    │
│ ENTERPRISE NETWORK ADDRESS IS NOT DISCLOSED TO THE SECOND SERVER, WHEREIN    │
│ THE SECOND SET OF PACKETS CAUSES THE SECOND SERVER TO SEND THE DATA TO A     │
│ THIRD SERVER THAT ACTS AS IF IT WERE AN ENTERPRISE SERVER WITHIN THE         │
│ ENTERPRISE NETWORK BUT IS ACTUALLY OUTSIDE OF THE ENTERPRISE NETWORK AND     │
│ DOES NOT STORE ENTERPRISE DATA, WHEREIN THE PRESENCE OF THE TOKEN IN THE     │
│ SECOND SET OF PACKETS ALLOWS FOR DETERMINING WHETHER ONE OF THE ENTERPRISE   │
│ END STATIONS HAS BEEN COMPROMISED, WHEREIN AT LEAST ONE OF THE ENTERPRISE    │
│ END STATION OR THE SOURCE ENTERPRISE NETWORK ADDRESS CAN BE DETERMINED       │
│ WITHIN THE ENTERPRISE BASED UPON THE IDENTIFIER, AND WHEREIN OUTSIDE THE     │
│ ENTERPRISE THE IDENTIFIER DISTINGUISHES BETWEEN TRAFFIC SENT FROM DIFFERENT  │
│ SOURCE ENTERPRISE NETWORK ADDRESSES WITHOUT DISCLOSING THE DIFFERENT         │
│ SOURCE ENTERPRISE NETWORK ADDRESS 810                                        │
│  ┌────────────────────────────────────────────────────────────────────────┐ │
│  │                    DETERMINE THE IDENTIFIER 815                        │ │
│  │ ┌────────────────────────────────────────────────────────────────────┐ │ │
│  │ │ GENERATE THE IDENTIFIER BASED UPON THE SOURCE ENTERPRISE           │ │ │
│  │ │ NETWORK ADDRESS 820                                                │ │ │
│  │ │ ┌────────────────────────────────────────────────────────────────┐ │ │ │
│  │ │ │ APPLY AN OBFUSCATION ALGORITHM USING AT LEAST SOME OF THE      │ │ │ │
│  │ │ │ SOURCE ENTERPRISE NETWORK ADDRESS 825                          │ │ │ │
│  │ │ ├────────────────────────────────────────────────────────────────┤ │ │ │
│  │ │ │ ENCRYPT THE SOURCE ENTERPRISE NETWORK ADDRESS TO YIELD THE     │ │ │ │
│  │ │ │ IDENTIFIER 830                                                 │ │ │ │
│  │ │ └────────────────────────────────────────────────────────────────┘ │ │ │
│  │ └────────────────────────────────────────────────────────────────────┘ │ │
│  │ ┌────────────────────────────────────────────────────────────────────┐ │ │
│  │ │ PERFORM A LOOKUP TO SELECT THE IDENTIFIER USING THE SOURCE         │ │ │
│  │ │ ENTERPRISE NETWORK ADDRESS 835                                     │ │ │
│  │ └────────────────────────────────────────────────────────────────────┘ │ │
│  └────────────────────────────────────────────────────────────────────────┘ │
│  ┌────────────────────────────────────────────────────────────────────────┐ │
│  │ THE SECOND SET OF PACKETS FURTHER INCLUDES A CLIENT IDENTIFIER         │ │
│  │ ASSOCIATED WITH THE ENTERPRISE (ADDED BY THE FIRST SERVER) 840         │ │
│  └────────────────────────────────────────────────────────────────────────┘ │
└──────────────────────────────────────────────────────────────────────────────┘
                                      │                         │ TO 905
                                      ▼                         │ (FIG 9)
┌──────────────────────────────────────────────────────────────┐ ▼
│ RECEIVE A THIRD SET OF ONE OR MORE PACKETS CARRYING RESPONSE │
│ DATA THAT WAS GENERATED BY THE THIRD SERVER BASED AT LEAST   │
│ IN PART UPON THE DATA OF THE SECOND SET OF PACKETS, WHEREIN  │
│ THE THIRD SET OF PACKETS DOES NOT INCLUDE THE SOURCE         │
│ ENTERPRISE NETWORK ADDRESS 845                               │
└──────────────────────────────────────────────────────────────┘
                                      │
                                      ▼
┌──────────────────────────────────────────────────────────────┐
│ TRANSMIT A FOURTH SET OF ONE OR MORE PACKETS CARRYING THE    │
│ RESPONSE DATA GENERATED BY THE THIRD SERVER TO THE SOURCE    │
│ ENTERPRISE NETWORK ADDRESS, WHEREIN THE FIRST SERVER         │
│ DETERMINED THE SOURCE ENTERPRISE NETWORK ADDRESS TO BE USED  │
│ AS A DESTINATION FOR THE FOURTH SET OF PACKETS 850           │
└──────────────────────────────────────────────────────────────┘
```

*FIG. 8*

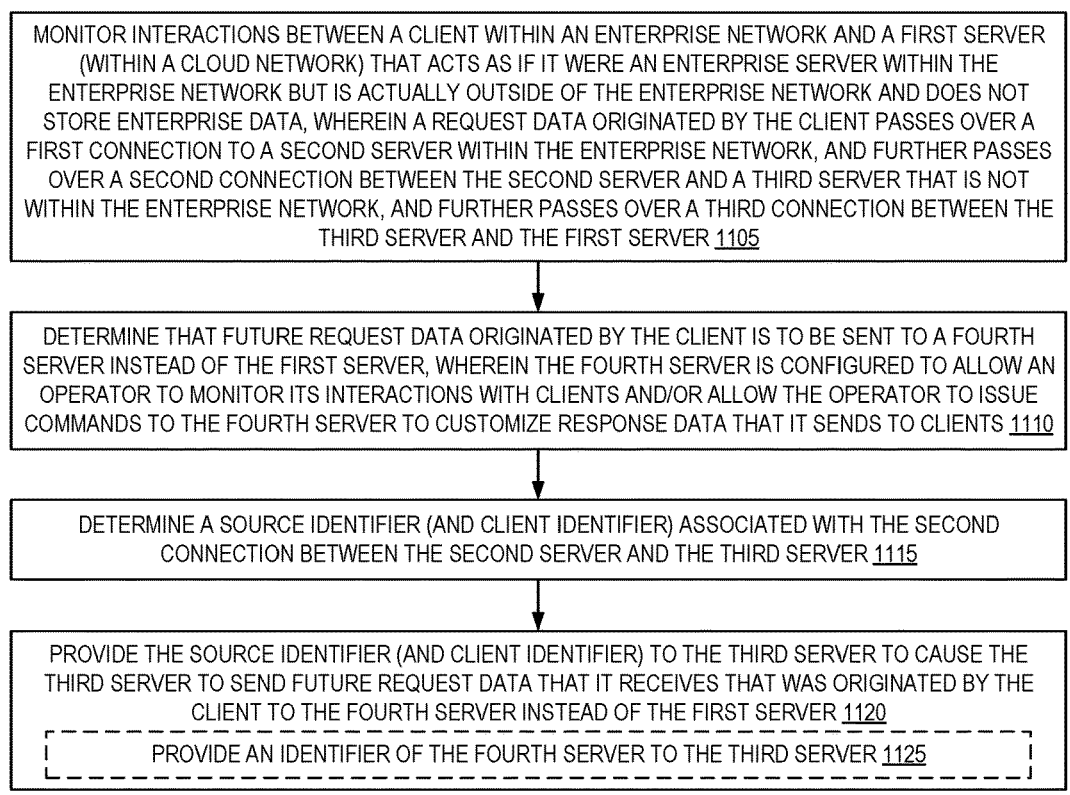
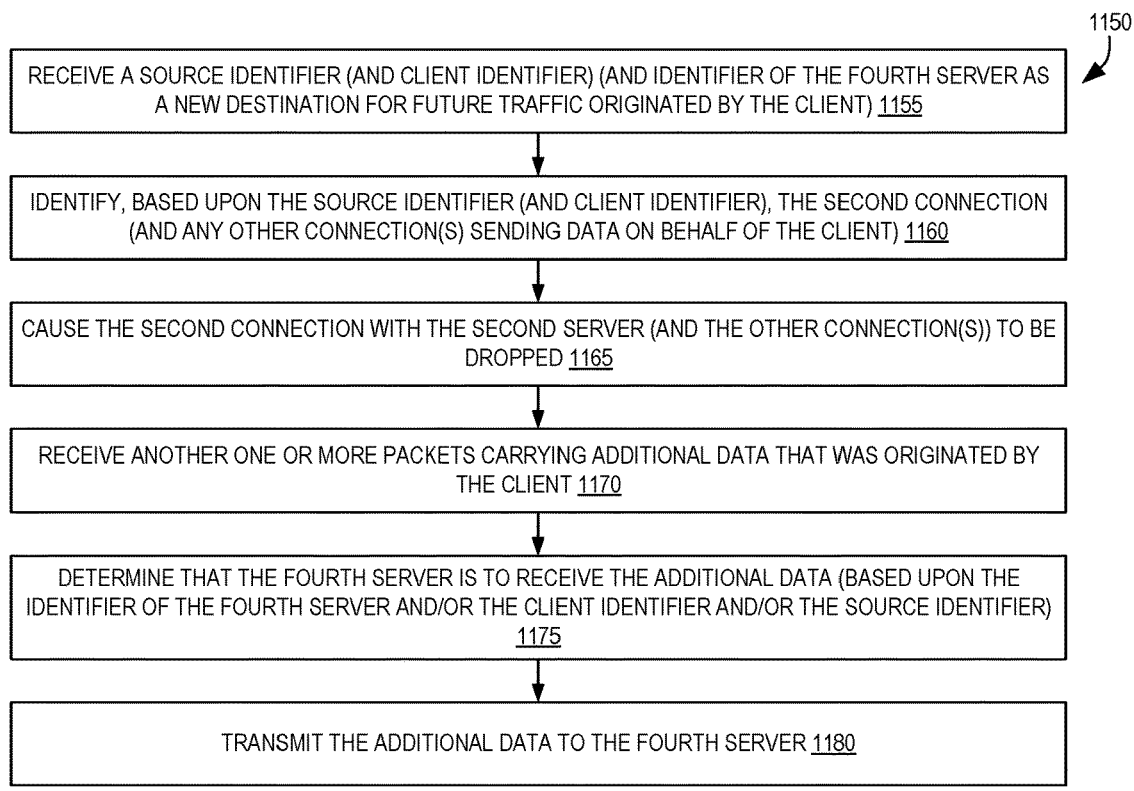
FIG. 11

TECHNIQUES FOR SECURELY DETECTING COMPROMISES OF ENTERPRISE END STATIONS UTILIZING TUNNEL TOKENS

CROSS-REFERENCE TO RELATED APPLICATIONS

This application is a continuation of U.S. application Ser. No. 15/187,657, filed Jun. 20, 2016 (now U.S. Pat. No. 10,567,342, issued Feb. 18, 2020), which claims the benefit of U.S. Provisional Application No. 62/299,472, filed Feb. 24, 2016, which are hereby incorporated by reference.

FIELD

Embodiments of the invention relate to the field of networking; and more specifically, to techniques for securely detecting compromises of enterprise end stations utilizing tunnel tokens.

BACKGROUND

In the field of computer security, the term "honeypot" is used to refer to a trap set to detect, deflect, or counteract attempts at an unauthorized use or malicious use of information systems. Generally, a honeypot is a decoy server or end station that appears to contain information or a resource of value to attackers, but in actuality may be isolated and/or monitored and not include legitimate information or resources. Honeypots allow system operators to learn how attackers probe and attempt to gain access to end stations by maintaining a record of the attacker's activities. Further, honeypots may also gather evidence to be used to assist in the apprehension or prosecution of attackers.

Thus, honeypots are security resources that are intended to be probed, attacked, and compromised to allow for information about the attacker and the techniques of the attacker to be discovered. Production honeypots, as compared to research honeypots that seek to research threats being used, are typically placed within a production network (i.e., a network actively used for other purposes unrelated to threat/attack detection alone) along with other production computing resources used by authorized users of the production network to improve the security of the production network.

Honeypots can be classified as either high-interaction or low-interaction. High-interaction honeypots may utilize actual computing resources and/or software (e.g., a fully-installed and configured Unix system) to interact with potential attackers to provide a detailed and complete view of an attack, whereas low-interaction honeypots typically emulate one or more potentially vulnerable services or software (e.g., a standalone FTP server, or a standard Unix server with several typically attacked services, such as Finger, Telnet, and/or File Transfer Protocol (FTP)), and thus cannot typically become infected or compromised by an attack.

Some security approaches have turned to the use of "honey tokens" to attempt to detect intrusions. The term "honey token" refers to honeypots that are not servers or server end stations. Instead, honey tokens can be pieces of information placed in server data repositories that are easy to detect when used/accessed, and are rarely (if ever) used/accessed by an authorized user. For example, a honey token could be a user account configured for a server or server end station that is not assigned to or used by any authorized user, or a database entry that would typically only be selected by a malicious query. Accordingly, a compromise of the server having placed thereon a honey token can be identified when, for example, the honey token is detected outside of the server's data repository, or when an access to the honey token within the server data repository occurs. Thus, upon an attempted use of the user account honey token (e.g., an attempt to log on to a server) or an attempted access of the database entry including a honey token, an alarm can be issued to notify interested parties about the occurrence of the compromise.

However, successfully deploying and utilizing honeypots and honey tokens in enterprises has proven extremely challenging. For example, to implement honeypots, additional computing resources (e.g., server end stations, special-purpose software, etc.) need to be acquired, configured, deployed, managed, monitored, etc., by the implementing enterprises. In many cases, these enterprises often lose the desire or ability to maintain the operation of these systems over time.

BRIEF DESCRIPTION OF THE DRAWINGS

The invention may best be understood by referring to the following description and accompanying drawings that are used to illustrate embodiments of the invention. In the drawings:

FIG. 8 is a flow diagram illustrating operations of a flow that can be performed by a TTS as part of implementing the secure detection of compromises of enterprise end stations using tunnel tokens according to some embodiments.

FIG. 11 is a flow diagram illustrating operations of a flow that can be performed by a TMM and operations of a flow that can be performed by a TGS, as part of implementing the secure detection of compromises of enterprise end stations using tunnel tokens according to some embodiments.

DESCRIPTION OF EMBODIMENTS

Figure 1:
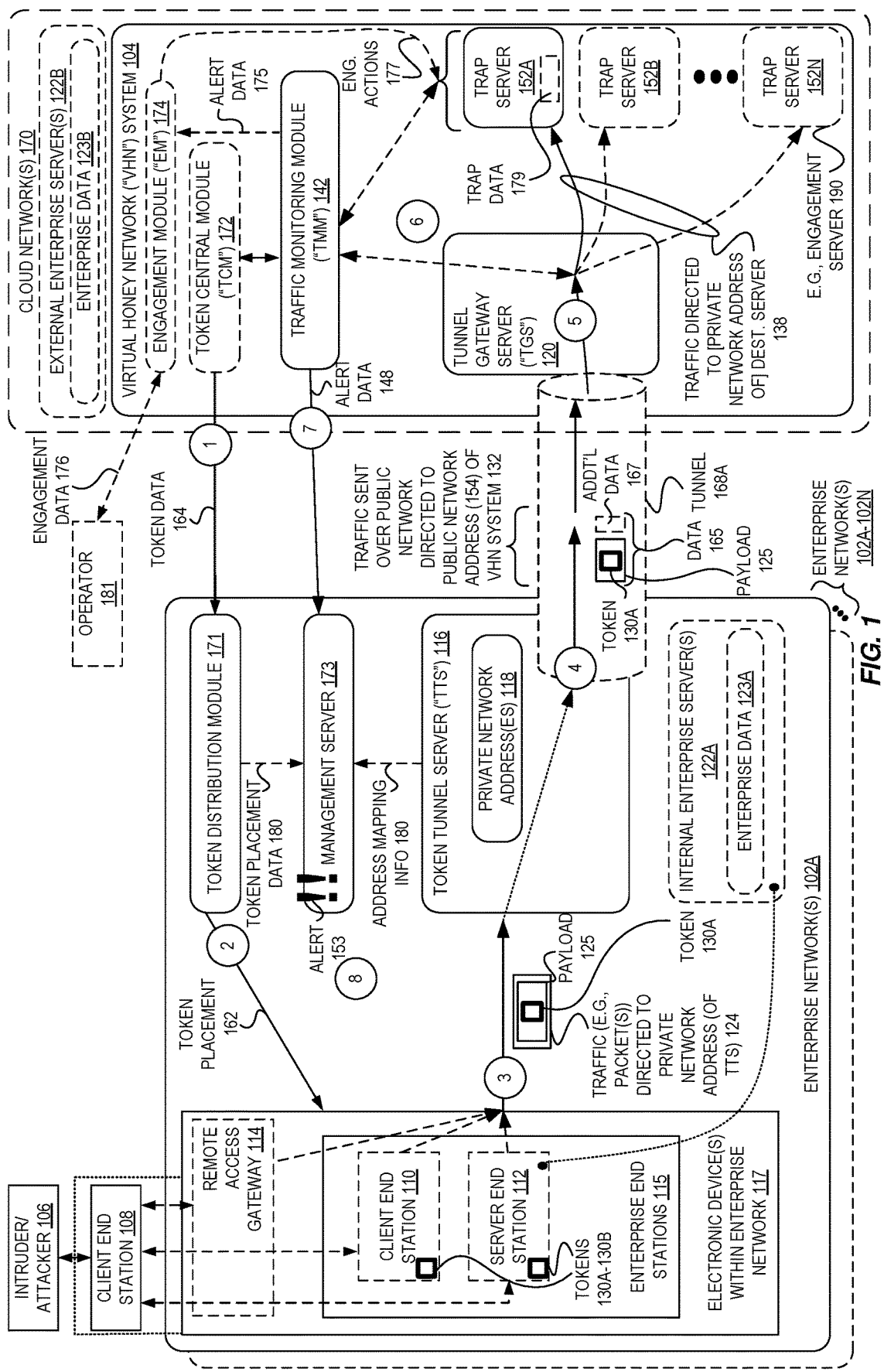
FIG. 1 is a block diagram illustrating an exemplary system for securely detecting compromises of enterprise end stations using tunnel tokens according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks, optical disks, random access memory (RAM), read only memory (ROM), flash memory devices, phase-change memory) and transitory computer-readable communication media (e.g., electrical, optical, acoustical or other form of propagated signals, such as carrier waves, infrared signals, digital signals, etc.). In addition, such electronic devices include hardware, such as a set of one or more processors coupled to one or more other components, e.g., one or more non-transitory machine-readable storage media to store code and/or data, and a set of one or more wired and/or wireless network interfaces allowing the electronic device to transmit data to and receive data from other electronic devices, typically across one or more networks (e.g., Local Area Networks (LANs), the Internet). The coupling of the set of processors and other components is typically implemented through one or more interconnects within the electronic device (e.g., busses and possibly bridges). Thus, the non-transitory machine-readable storage media of a given electronic device typically stores code (i.e., instructions) for execution on the set of one or more processors of that electronic device. Of course, one or more parts of an embodiment of the invention may be implemented using different combinations of software, firmware, and/or hardware.

As used herein, the term "token" may be used to refer to a piece of data that appears to be of use for a computing resource. For example, a token can be a public or private network address, hostname, path, etc., that appears to identify a location of a resource that could be used. As additional examples, a token can be a username, password, key, certificate, challenge response, etc., that appears to be useful for gaining access to a resource (e.g., by allowing a user to perform an authentication process, etc.). As additional examples, a token can be a protocol identifier (e.g., "FTP" for File Transfer Protocol), a software/product name and/or version/revision/etc. (e.g., "MySQL 5.6"), or other piece of information identifying how to access a resource.

Unless specifically made obvious by the context of use, the term "token" may be broadly used herein to encompass "honey tokens," "reverse honey tokens," and/or "noisy tokens", though other types of tokens can also be utilized.

As described above, the term "honey token" can refer to a piece of information placed in a server data repository that is relatively easy to detect when used or accessed, and is rarely (if ever) used or accessed by an authorized user. For example, a honey token could be a user account identifier (e.g., a username) of an account configured for a server or server end station that is not assigned to or used by any authorized user, a database entry that would typically only be selected by a malicious query, etc.

A "reverse" honey token, unlike a regular or "traditional" honey token, is not placed for discovery within a server or server end station. Instead, reverse honey tokens can be placed in client end stations (e.g., into one or more user electronic devices within an enterprise utilized by employees, for example) at locations such that the reverse honey tokens are not easily found or utilized by the authorized end users of those client end stations. Reverse honey tokens can have an apparent use at a server that is typically not hosted by or co-located with the client end station where they are placed.

A "noisy" token is one that is placed in a particular location (or as a particular type of file) within a device such that it is "activated" upon non-malicious operations of the device and also likely to be used by an attacker/intruder. In particular, noisy tokens are designed with the intention to be deployed on assets in such a way that local operations on these assets generate network traffic (e.g., network connections). For example, certain local operations on noisy tokens may generate traffic to a configured target server using a target protocol and port. This traffic can then be detected/read by a sensor and translated back to the local operations that were performed on the asset. For example, a noisy token could be "activated" (i.e., generate network traffic) on a regular or semi-regular basis: upon a user logging in to a machine, upon an anti-virus scan, after each defined interval amount of time or at particular times of day, etc. Accordingly, from the resulting activity generated by these noisy tokens, patterns from the network noise can be identified that allow the system to identify/detect deviations from these patterns that likely result from the activity of an attacker/intruder, and/or profile assets and other domain accounts inside the network.

Typically, the use of token technologies requires that an appropriate enterprise server exists to consume each type of token over a given protocol (e.g., a web server for Hypertext Transfer Protocol (HTTP), database (DB) server for various DB vendor protocols, file server for Common Internet File System (CIFS) or Server Message Block (SMB), etc.) and that an appropriate monitoring system be in place to detect the sending of a token to an appropriate enterprise server (e.g., web application firewall (WAF) for HTTP, database activity monitor (DAM) for databases, etc.).

However, in many environments monitoring systems may not be in place and/or may not be able to be deployed due to a variety of reasons such as a lack of physical space for additional hardware, high cost of the systems, lack of time to install and monitor, lack of power, etc. Further, some environments may only have a limited number or type of monitoring systems in place, which can drastically limit the types of tokens that can be utilized. For example, an enterprise might be limited to only use database-related tokens if the enterprise only has a DAM installed in front of production databases, but does not have any other monitoring systems.

One approach to overcoming the above-mentioned issues is referred to as "BYOH" or "Bring Your Own Honeypot (server)." In such an approach, an enterprise may acquire (e.g., from a vendor) a single server end station that comes preinstalled with the necessary monitoring system products (e.g., a management server, file activity monitor, database activity monitor, web application firewall, etc., such as those developed by Imperva Inc. of Redwood Shores, Calif.) and also the necessary enterprise servers (e.g., a file server, a database server, a web server, etc.) required to implement a strong system. However, although this approach is feasible, it is tremendously complex to create, deploy (as it may require several additional computer end stations to be added into the enterprise network environment) and support over time (e.g., it could come bundled with many different servers). Additionally, this approach is not particularly flexible for adding new types of tokens or servers, as BYOH systems may be somewhat "static" in that they are largely limited to the scope of the original deployment.

Notably, it has been discovered that at least for some types of tokens, the authenticity of the enterprise server may not be a high priority, as many attackers do not have an in-depth knowledge of an organization required to be able to discern authentic resources from in-authentic resources. Further, it has been discovered that the use of some types of tokens can lead to tremendous benefits via the use of data analytics and machine learning algorithms (e.g., for detecting patterns of use), which can require substantial computing resources (e.g., processor time, memory, etc.). However, it can be very difficult to employ such complex and resource-intensive data analytics and machine learning algorithms using on-premise devices, which are often busy performing "regular" server duties and/or monitoring duties.

Accordingly, embodiments of a token system are disclosed herein and include methods, non-transitory computer readable storage media, systems, and apparatuses for securely detecting compromises of enterprise end stations utilizing "tunnel tokens." Embodiments can be configured to support potentially an unlimited variety of protocols, utilize a simple and stable on-premise component that is easy to deploy and requires no physical changes for supporting new protocols or new detection algorithms, be decoupled from existing activity monitoring deployments/products, allow agile development allowing for fast introduction of experimental tokens and detection algorithms, and/or not affect existing token distribution mechanisms within a network.

FIG. 1 is a block diagram illustrating an exemplary system 100 for securely detecting compromises of enterprise end stations 115 using tunnel tokens according to some embodiments.

In some embodiments, at circle '1' tokens 130A-130B can be caused to be placed (e.g., by token distribution module 171) at enterprise end stations 115 within the enterprise network 102A. In some embodiments, the tokens 130A-130B are generated by a token central module ("TCM") 172. In various embodiments utilizing a token central module 172, this TCM 172 could be located remote from the enterprise network 102A (e.g., within a cloud network 170, as illustrated), although in other embodiments the TCM 172 can be located within the enterprise network 102A.

However, in embodiments where the TCM 172 is located within the enterprise or in some embodiments when no TCM 172 is utilized, the token distribution module 171 may be configured to generate the tokens, and may further be configured to provide information describing the tokens (e.g., the token values themselves, an algorithm/key used to generate the tokens, etc.) back to a Virtual Honey Network ("VHN") system 104 (e.g., to a traffic monitoring module ("TMM") 142), which will be described in further detail later herein.

In some embodiments, the token distribution module 171, for performing token placement operations 162 (at circle '2'), may utilize software to distribute Windows® Active Directory Group Policy Objects (GPO), and/or a Microsoft® System Center Configuration Manager (SCCM) component, and/or an IBM® Tivoli® component, and/or another enterprise end station management software package, though other software can be utilized to the same effect.

In some embodiments, the placed tokens 130A-130B can include data such as credentials of an enterprise account (e.g., a username, password, key), a filename and/or path, a type identifier of an apparent enterprise server, a network address (such as an IP address of a server), a directory name, a file system path, a Uniform Resource Locator (URL) or Uniform Resource Identifier (URI), a port number, a machine/host name, a database name, a table name, a database column name, a database query, a database connection string, information describing a protocol, an encryption key, a hash function name or algorithm, data representing an answer for a "secret" question, a program name, a telephone number, an operating system name or identifier, a name or identifier of a software program, a cookie value of an HTTP cookie, or another type of information that, from the viewpoint of an attacker 106, appears to be useful for accessing data (e.g., enterprise data) from an electronic device or server.

In some embodiments, private network address(es) 118 of a Token Tunnel Server (or "TTS") 116 can also be placed (e.g., as part of token placement 162 operations of circle '2') on enterprise end stations 115, perhaps together with the placed tokens 130A-130B in a same file, directory, storage location, data structure, etc. The private network address(es) 118 may be placed in such a manner as to appear to the attacker 106 (e.g., based upon context of placement, such as within a configuration file or shortcut, etc.) to be addresses utilized by an enterprise resource such as, but not limited to, a web server, database server, mail server, file server, etc. However, these private network address(es) 118 are not utilized by a legitimate enterprise resource (e.g., an internal enterprise server 122A having enterprise data 123A, or external enterprise server(s) 122B having enterprise data 123B) but are instead utilized by the TTS 116.

In some embodiments, the private network address(es) may not literally be placed as part of token placement 162 operations, but instead, other data associated with the private network address(es) may be placed that can be translated or converted by an attacker 106 to yield the private network address(es) 118. For example, in some embodiments a hostname can be placed, which can thus be resolved by the attacker 106 (e.g., using Domain Name Server (DNS) functionalities of the enterprise network 102A) to reveal the private network address(es) 118. Thus, in some embodiments, the private network address(es) 118 themselves need not be placed, but instead information is placed allowing the attacker 106 to learn or discover the private network address(es) 118.

However, in other embodiments, the private network address(es) 118 (or translatable associated data) need not be placed at all. For example, in some embodiments the token(s) 130A-130B can be placed by themselves, and instead, the attacker 106 could seek to identify the private network address(es) by other means, including but not limited to performing network discovery techniques (e.g., IP scanning, etc.) known to those of skill in the art.

Thus, an attacker 106 may discover one or more of the placed tokens 130A-130B and attempt to "exploit" them by using them to access what appears to be an enterprise resource. Accordingly, the attacker 106 may cause an enterprise device 117 within the enterprise network to send traffic 124 (e.g., one or more packets) including one or more tokens 130A-130B (here illustrated as just one token 130A) within a payload 125.

In some embodiments, traffic 124 can include a payload 125 having data in accordance with an application layer protocol. The term "application layer" generally refers to an abstraction layer specifying the shared protocols and/or interface methods used by hosts in a communications network. This application layer abstraction is utilized in both of the standard models of computer networking: the Internet Protocol Suite (i.e., Transmission Control Protocol/Internet Protocol (TCP/IP)) and the Open Systems Interconnection (OSI) model. A few examples of application layer protocols include, but are not limited to, Hypertext Transfer Protocol (HTTP) for web application communication, Telnet for remote login to hosts, DNS for networking support, File Transfer Protocol (FTP) or Network File Systems (NFS) or Common Internet File System (CIFS) or Server Message Block (SMB) for file storage/retrieval, Internet Message Access Protocol (IMAP) and Post Office Protocol (POP) for receiving email, Simple Mail Transfer Protocol (SMTP) for transmitting email, Internet Relay Chat (IRC) for real-time messaging, Session Initiation Protocol (SIP) for voice and video calling, Network News Transfer Protocol (NNTP) for transporting news articles, Extensible Messaging and Presence Protocol (XMPP) for messaging, Network File System (NFS) for the remote access of files, Simple Network Management Protocol (SNMP) or Common Management Information Services and Protocol over TCP (CMOT) for remote host management, etc.

Accordingly, the payload 125 can include commands or functions associated with one or more application layer protocols, and can include one or more tokens 130A-130B. For example, the payload 125 could be an HTTP request message including a URL/URI token 130A (or directory or filename token within a URL/URI) or a name/value pair (as part of a query string) token 130A. As another example, the payload 125 could be a database query or command (e.g., a Structured Query Language) including a table name, database name, field name, etc., that is a token 130A. As yet another example, the payload 125 could be a CIFS message (e.g., a request to open or read a file) including a filename token. Accordingly, many different token possibilities can be implemented by those of skill in the art, and the selection of these possibilities and/or associated protocols can be customized to a particular deployment environment (e.g., an enterprise network 102A) based upon what types of enterprise resources might be expected to be utilized in that environment, i.e., what types may believably appear to be authentic to an attacker when discovered in a particular context.

As illustrated, the attacker 106 may cause the traffic 124 to be sent using device having a presence within the enterprise network 102A. For example, the attacker 106 may utilize a client end station 108 that is physically located separate from the enterprise (and thus, the enterprise network 102A), but may connect to the enterprise network 102A such as via a VPN connection or other type of connection by connecting (e.g., across the Internet) to a remote access gateway 114 within, or otherwise providing access to, the enterprise network 102A. In some embodiments, the attacker 106, through use of this client end station 108, may further connect to one or more enterprise end stations 115 of the enterprise network 102A, such as a client end station 110 (e.g., a Personal Computer (PC)/workstation of an employee) or a server end station 112, which could potentially comprise a legitimate internal enterprise server 122A (e.g., a file server actively used within the enterprise) that could have legitimate enterprise data 123A (e.g., files used by users within the enterprise).

However, in some embodiments, the attacker 106 may not actively have a connection into the enterprise network at the time of the illustrated operations. For example, the attacker 106 may benefit from a piece of malware being installed upon one or more enterprise end stations 115, which could look for tokens 130A-130B and/or report network information (such as the tokens) back to the attacker 106. The malware could even directly cause the traffic 124 to be originated within the enterprise network 102A with or without any knowledge on the part of the attacker 106.

Thus, in some embodiments, the traffic 124 is caused to be sent (at circle '3') within the enterprise network 102A and is destined to the learned/discovered private network address 118 of what the attacker 106 believes may be a legitimate enterprise resource. This traffic 124 can include one or more packets carrying one or more payloads 125, which can carry one (or more) tokens 130A.

However, the private network address 118 are instead utilized by (or assigned to) a TTS 116 deployed within the enterprise network 102A, which therefore receives the traffic 124.

The TTS 116, in some embodiments, is configured to listen on one or more internal IP addresses 118 to which tokens 130 are directed, and appear to the attacker 106 as a legitimate enterprise resource (e.g., an internal enterprise server 122A). In some embodiments, multiple physical or virtual network interfaces can be utilized on a same end station (i.e., a computing device implementing the TTS 116) or on a number of end stations implementing the TTS 116 to simulate different internal enterprise servers 122A. In some embodiments, the TTS 116 is configured to listen on multiple ports commonly associated with those protocols for which tokens have been placed, or on ports that have been indicated as being in use, such as port identifiers placed with the tokens 130A-130B.

The TTS 116, in some embodiments, is configured to send (at circle '4') traffic 132 including the payload 125 from the received traffic 124 and possibly additional data 167 (as described later herein, which may be added by the TTS 116) within one or more other packets (as "traffic" 132) over a public network (e.g., the Internet) to a public network address (e.g., an IPv4 or IPv6 address) of a Tunnel Gateway Server (TGS) 120. As used herein, the combination of the payload 125 and any additional data 167 may be referred to as just "data" 165.

In some embodiments, the traffic 132 can be sent over a tunnel 168A such as an IP security (IPSec) tunnel, Generic Routing Encapsulation (GRE) tunnel, etc., though in other embodiments the traffic 132 may be sent using "plain" TCP/IP or via another non-tunneled set of protocols. Accordingly, in some embodiments the TTS 116 thus "tunnels" (e.g., by sending traffic 132 over an encrypted communication channel) incoming payload(s) (e.g., payload 125) to a potentially multi-tenant environment in the cloud—the VHN system 104.

The TGS 120 can operate as part of a Virtual Honey Network ("VHN") system 104 implemented in one or more cloud networks 170, and can interact with one or more TTSs 116 (of one or more enterprise networks) of one or multiple enterprises.

Upon receipt of forwarded (or "tunneled") traffic 132, the TGS 120 in some embodiments is configured to select (or identify) a trap server at circle '5' that is to receive the data 165, and send the payload 125 (and possibly the additional data) as traffic 138 to the selected trap server.

In some embodiments, one or more trap servers 152A-152N are hosted remotely from the enterprise network 102A and are accessed by attackers 106 via their directing of traffic to the private network address(es) 118 of the enterprise network after the private network address(es) 118 were discovered by the attacker 106.

The trap servers 152A-152N, in some embodiments, are configured to interact with attackers 106 by receiving the forwarded payloads 125 originated by the attacker (i.e., sent within the enterprise network 102A to the TTS 116, on to the TGS 120, and ultimately to the trap servers), and generating response traffic to be sent back to the attacker 106—e.g., from the trap servers to the TGS 120, back through the tunnel 168 (or other network connection/path) to the TTS 116, and ultimately back to whatever electronic device 117 is utilized by (or under the control of) the attacker 106.

In some embodiments, the trap servers 152A-152N do not have any actual (or legitimate) enterprise data stored thereon, but may instead have trap data 179 that could be generic data or data generated specifically to appear as being specific to the enterprise(s). For example, if an enterprise implementing a TTS 116 is a financial company, the trap data 179 could include false/fake financial data, such as false financial account numbers, false government-issued identification numbers (e.g., social security numbers), false user account names and/or passwords, false payroll information, etc.

Figure 5:
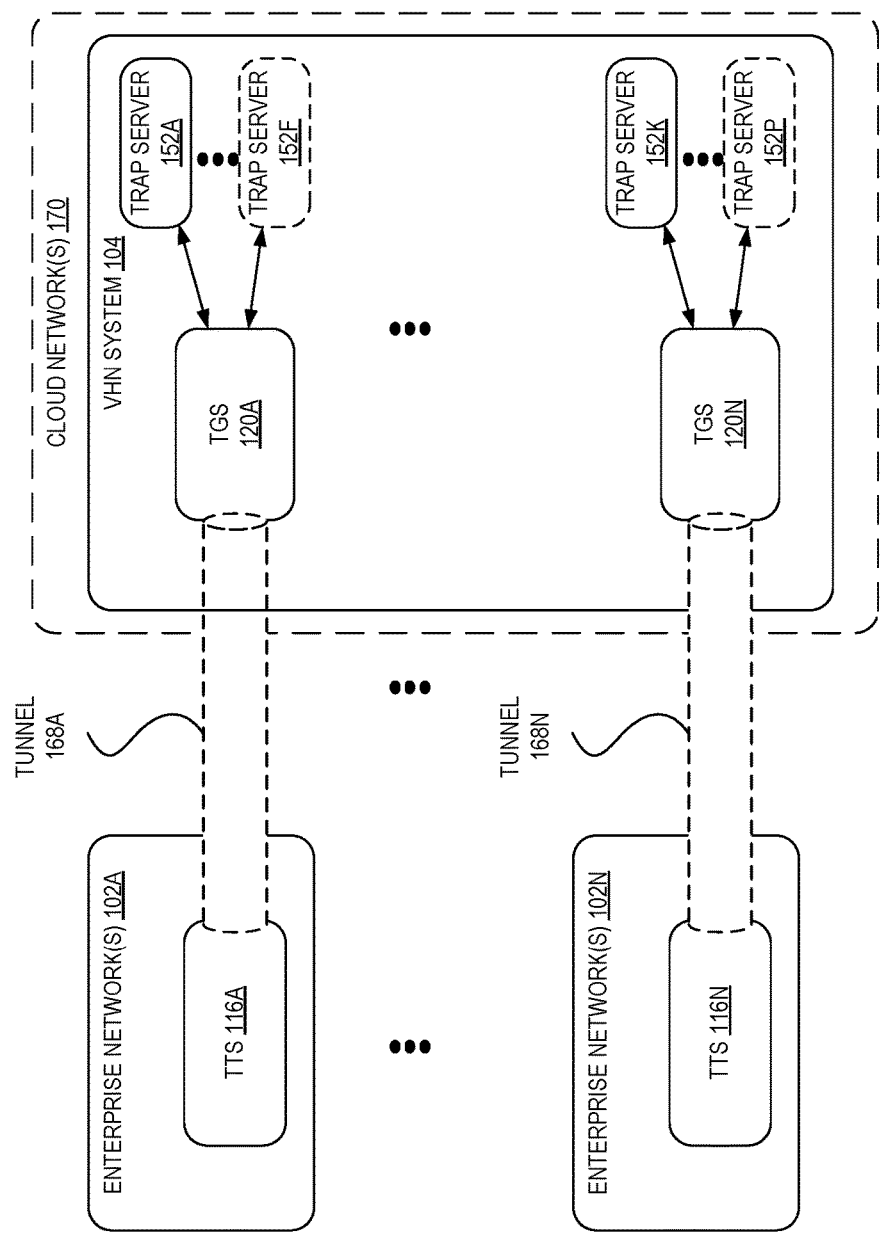
FIG. 5 is a block diagram illustrating a dedicated configuration providing client isolation via dedicated resources to implement the secure detection of compromises of enterprise end stations using tunnel tokens according to some embodiments.
Figure 6:
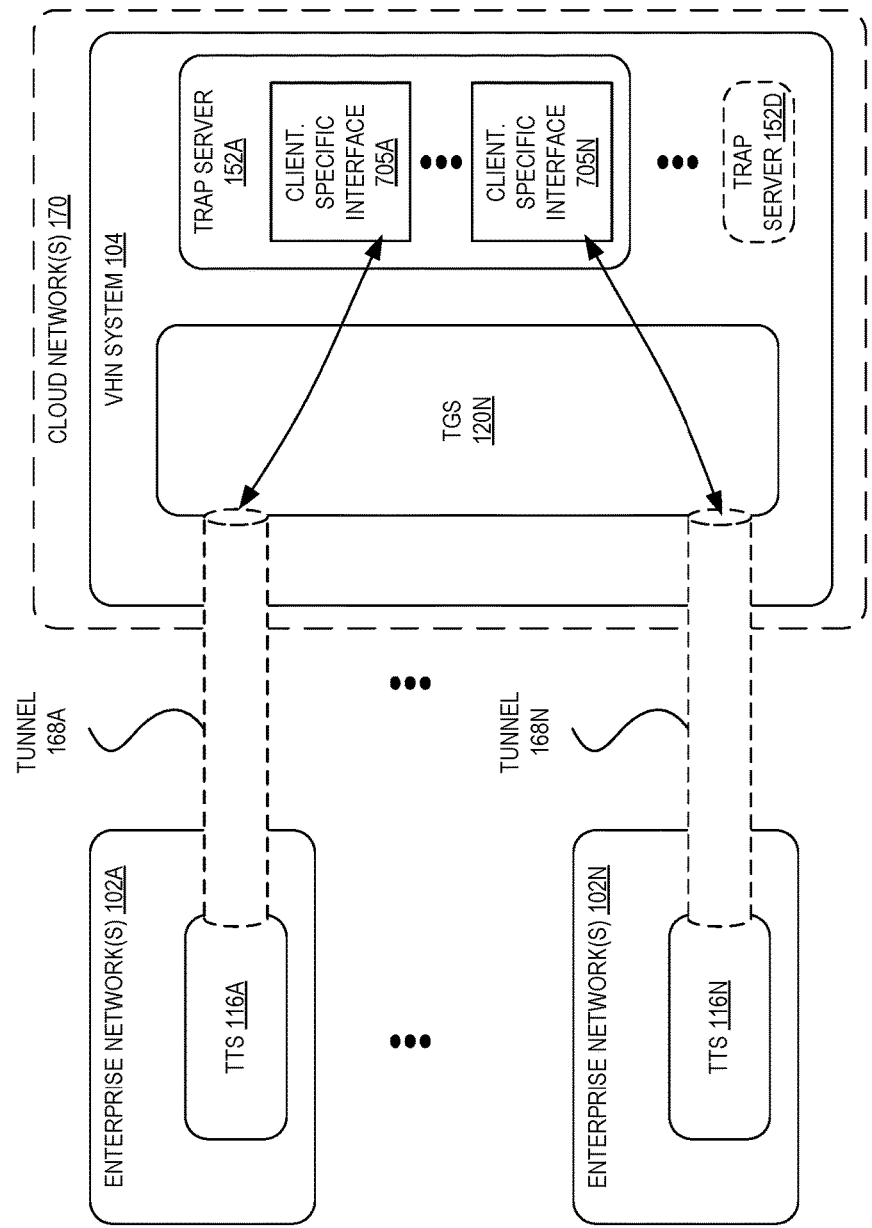
FIG. 6 is a block diagram illustrating a shared configuration providing client isolation utilizing multiple interfaces to implement the secure detection of compromises of enterprise end stations using tunnel tokens according to some embodiments.
Figure 7:
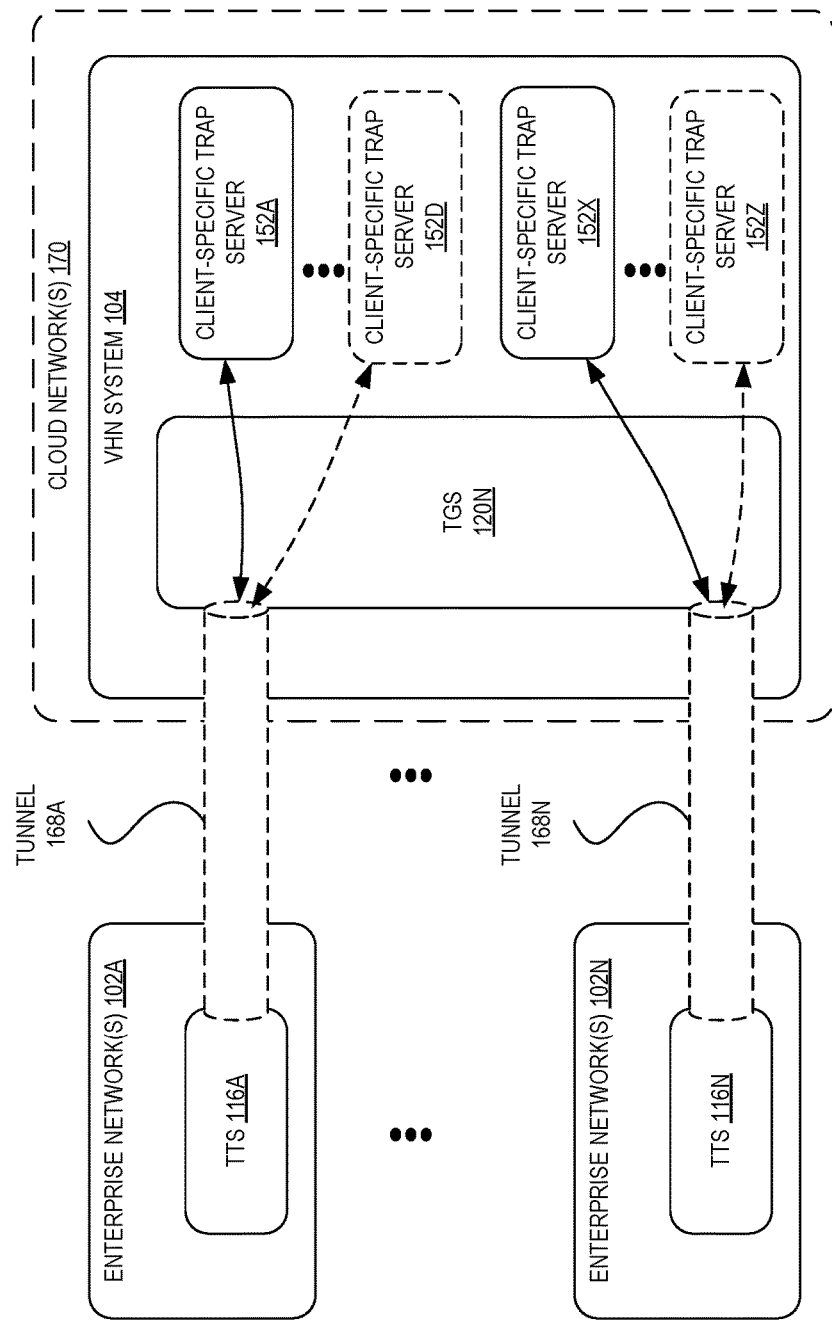
FIG. 7 is a block diagram illustrating a shared configuration providing client isolation utilizing dedicated trap servers to implement the secure detection of compromises of enterprise end stations using tunnel tokens according to some embodiments.

As will be detailed further herein with regard to FIGS. 5-7, in various embodiments there can be a varied number and/or type of trap servers employed. For example, one trap server 152A could be a web application server while another trap server 152B could be a file server and yet another trap server 152C could be a database server. Additionally, in some embodiments the trap servers 152A-152N may be utilized for different enterprise networks 102A-102N, potentially of different enterprises. These trap servers can, in some embodiments, be shared (and thus one trap server can interact with multiple enterprise networks or enterprises) or could be dedicated (and thus one trap server will interact with only one enterprise network or enterprise).

In some embodiments, one or more of the trap servers 152A-152N can be "commodity"-type servers that are provided by third parties, such as open source servers, proprietary servers, etc., and in some embodiments different ones of the trap servers 152A-152N—of a same or different type—can be implemented from different sources (e.g., different providers/vendors). In some such embodiments, the trap servers 152A can be easily acquired, updated, launched, managed, etc., using conventional server management tools known to those of skill in the art.

In some embodiments, the traffic 138 sent to the trap server 152A (and possibly response traffic sent from the trap server 152A) can be monitored by a Traffic Monitoring Module (or "TMM") 142 at circle '6'. The TMM 142 can be configured using rules/logic to identify potential malicious traffic, for example, to determine when traffic 138 is directed to one of the trap servers 152A-152N that includes one or more tokens 130A-130B.

In various embodiments, the TMM 142 can monitor the traffic in a variety of ways. In some embodiments, the TGS 120 can be configured to send some or all of the received payloads (e.g., copies of the received traffic 132 and/or traffic 138 directed to the trap servers) to the TMM 142, thus providing visibility of the traffic to the TMM 142.

In some embodiments, the TMM 142 can be configured to monitor the trap server(s) 152A-152N either directly or indirectly. For example, the TMM 142 can be configured to indirectly monitor the trap server(s) 152A-152N by reading log files (or other trap server data output as a result of processing traffic 138) created by the trap server(s) 152A-152N, and scan these log files or data for the tokens. As another example, in some embodiments the TMM 142 can directly monitor the trap server(s) 152A-152N by, for example, configuring the trap server(s) 152A-152N to report certain data to the TMM 142, such as some or all of the received traffic 138, etc.

Regardless of how the TMM 142 gains visibility into the traffic 138 and/or actions of the trap server(s) 152A-152N, the TMM 142 can be configured to utilize rules/logic to detect an alert triggering event (e.g., the use of a token 130A-130B within traffic 138 destined to the trap server 152A, such as token 130A carried in the payload 125). In some embodiments, the rules/logic can be implemented to watch for any of a list of tokens that are generated by the TCM 172, which the TCM 172 can provide to the TMM 142.

Further, in some embodiments, the TMM 142 can be configured to record traffic and/or token accesses in a database (not illustrated) and apply various detection algorithms to this data, such as machine learning algorithms. In some embodiments (e.g., using "noisy tokens"), a detection algorithm may be a multiple stage algorithm (e.g., a two-stage algorithm) where the first stage could be a profiling (or learning) stage based on collected data, and a second stage can include applying the profile (or learned behavior) to new data to identify atypical traffic patterns, or patterns of traffic that are likely to be indicative of an attack, etc. Notably, this analysis can be relatively resource intensive (e.g., processing time, required memory, etc.) and thus it is well-served by being performed in a cloud network 170 environment as opposed to in an enterprise network 102A.

Upon the TMM 142 detecting that an alert triggering event has occurred (e.g., that a token 130A has been utilized as it has been detected within traffic 138), the TMM 142 can in response provide alert data 148 (at circle '7') back to the enterprise network 102A (e.g., to a management server 173, which could be a Security Information and Event Management (SIEM) server). This providing of the alert data 148 can occur through a dedicated protocol or a generic protocol (e.g., syslog), and may even occur via the TGS 120 through the tunnel 168A. Moreover, in some embodiments, the alert data (e.g., 148) generated by the TMM 142 can be viewed by an administrator using a specialized graphical user interface (GUI) that is provided from the VHN 104, and/or sent to designated administrators via email or other push communication channel.

In some embodiments, the providing of alert data 148 to the management server can cause it to generate an alert 153 at circle '8'. The alert 153 can result in any number of operations known to those of skill in the art, including but not limited to the sending of an electronic message (e.g., email, Short Message Service (SMS), instant message, etc.), causing a particular enterprise user to be notified (e.g., via voice message, via a web or application interface, etc.), etc.

Further, in some embodiments the operations can include automatically launching additional network security measures to attempt to protect the enterprise network(s) 102A from the attacker 106.

For example, the operations can include increasing an amount of logging or monitoring of some or all traffic/devices within the enterprise network. Thus, in some embodiments, particular traffic or electronic devices 117 associated with or known to be currently/previously utilized by the attacker 106—such as remote access gateway 114, client end station 110, server end station 112, etc.—can be more closely monitored.

Additionally or alternatively, in some embodiments, some or all traffic associated with the attacker 106 or electronic devices 117 associated with or known to be currently/previously utilized by the attacker 106 or client end station 108, etc., can further be blocked for a period of time or indefinitely.

For example, in some embodiments, the management server 173 can, based upon the alert data 148 and other enterprise data (e.g., token placement data 180 indicating which tokens have been placed and/or upon which end stations they have been placed, etc.) determine which of the electronic devices 117 originated the traffic 124 including the payload 125 having the token 130A, and/or determine which of the enterprise end stations 115 is the one where the token 130A was placed. In some scenarios, these end stations could be different—such as where an attacker 106 discovers/acquires the token 130A on one enterprise end station 115 but then utilizes a different electronic device 117 to actually send the traffic 124. In some embodiments, the management server 173 (as part of the alert 153), can cause security measures (e.g., logging, traffic blocking, etc.) to be applied to either one or both of these devices.

Additionally or alternatively, in some embodiments, the additional network security measures can include increasing an amount of security or logging of actual enterprise resources such as internal enterprise servers 122A, external enterprise servers 122B, etc., in order to quickly protect the enterprise network based upon the discovery of the attacker 106.

As introduced above, in some embodiments the traffic 132 sent between the TTS 116 and the TGS 120 may include additional data 167. In some embodiments, the TTS 116 can be configured to send, along with the payload 125, one or more additional identifiers (IDs) as the additional data 167 within the traffic 132, which can provide a number of benefits.

In some embodiments, the TTS 116 can insert a client ID (or enterprise ID) as additional data 167 which, from the perspective of the TGS 120 and/or VHN system 104, uniquely identifies the enterprise and/or the enterprise network 102A. This client ID can be used, for example, by the TGS 120 when determining which trap server 152A to send data (e.g., a payload and any additional data) to, as discussed later herein. In some embodiments, the client ID can be used by the TMM 142 for determining where (i.e., which management server 173) to provide the alert data 148, etc.

However, in some embodiments the determination of which trap server 152A to send data to can be made based upon a variety of factors, such as one or more of the source IP address of the received traffic (which will be specific to the enterprise), the client ID, a source ID (described later herein), the destination port of which the traffic was sent to, etc.

Additionally, in some embodiments, the TTS 116 can insert a protocol ID as additional data 167. This protocol ID can serve to uniquely identify the application layer protocol utilized in the payload 125—e.g., web, database, file, etc. In some embodiments, the protocol ID can be utilized by the TGS 120 to (in whole or in part) determine which of the trap servers 152A-152N to send the traffic 138 to. This can beneficially allow the TGS 120 to more quickly determine which trap server is to be the destination, as opposed to performing the more resource-intensive task of traffic analysis to attempt to identify the protocol based upon the data of the payload 125. For example, in some embodiments the protocol ID can be the destination port of the traffic 124 originated within the enterprise network 102A on behalf of the attacker. As another example, a protocol ID could be a value agreed upon by the TTS 116 and TGS 120 as uniquely indicating a "server type"—e.g., a value of "web" could indicate that the data 165 should be sent to a web server, etc.

Further, in some embodiments, the TTS 116 can additionally or alternatively insert a source ID as the additional data 167. In some embodiments, the source ID can unique identify, from the vantage of the TTS 116 (or another entity within the enterprise network 102A) a source of the traffic 124—e.g., one of the electronic devices 117 in the enterprise network. Notably, in some embodiments, this source ID (perhaps along with a client ID) may identify a particular "source" from the vantage of the VHN system 104 as a particular source ID may be frequently received at the TGS 120. However, in these embodiments, the VHN system 104 cannot determine any other information about the source (such as the enterprise "internal" network address used by the source, the user account associated with the source, etc.) from the source ID alone.

Accordingly, the tunnel 168A can be created in a manner such that the VHN 104 is not aware of internal addresses of the enterprise network, and similarly, such that the enterprise network is not aware of internal address of the VHN system 104. For example, in some embodiments the TTS 116 can be configured to send only the payload 125 of the traffic 124, as opposed to encapsulating all of the traffic 124 (i.e., both the payload and its headers) to thereby prevent the data leakage of internal network addresses within the traffic 124 (e.g., a source IP address utilized by the originating device—e.g., the remote access gateway 114, client end station 110, server end station 112, etc.) before sending it to the VHN system 104.

The source ID can be generated by the TTS 116 in a variety of ways, such as applying a random function or a cryptographic function (or another one-way or two-way transformation function known to those of skill in the art) to the source enterprise network address (e.g., the source IP address of the traffic 124) to yield the source ID. For example, in some embodiments the TTS 116 could apply a Secure Hash Algorithm (SHA) or MD5 hash function to the source enterprise network address, and use the result (or a portion of the result, such as a number of bits/bytes of the result) as the source ID.

In some embodiments, a mapping between the source enterprise network address and the source ID can be created and stored (in volatile and/or non-volatile memory or other storage) by the TTS 116. This stored mapping information can allow a source ID to, for example, be inserted into subsequent traffic from the same source enterprise network address more quickly (i.e., without having to re-generate the source ID for all subsequent traffic).

Additionally, in some embodiments where a mapping is created, the mapping data can be provided to the management server 173 as address mapping information 180. Accordingly, when an alert data 148 is provided to the management server 173, the alert data 148 may include the source ID of the involved traffic carrying a token, and thus the management server 173 can determine the original enterprise source network address from the source ID using the mapping data. Moreover, the management server can thus identify (e.g., based upon assigned IP addresses or historic logs) which electronic device 117 was using that enterprise source network address at the time of the origination of the traffic 124, while the VHN system 104 cannot.

Accordingly, some embodiments can thus determine which electronic device 117 originated the traffic 124 and also determine upon which enterprise end station 115 the particular alert-triggering token 130A was placed (e.g., using token placement data 180 and the token, which may be returned in the alert data 148), where these two devices may be the same or different devices. Thus, in some embodiments, the management server 173 as part of the alert 153 operations can increase/modify security related to both the traffic-originating device as well as the device at which the token was placed, as it can thus be determined that both devices are likely compromised by the attacker 106.

Accordingly, some embodiments—in addition to possibly realizing the benefits of tunneled tokens utilizing remote trap servers (such as the ability to have the focus of an attack be somewhat isolated in a different network, have the attack not involving legitimate enterprise resources/data, have the ability to utilize potentially a wide array of different types of trap servers, etc.)—can be configured to use source ID values to enable enterprise network security between the enterprise and the VHN system 104. For example, in some embodiments where the TTS 116 inserts a source ID as additional data 167, the source ID can thereby provide the VHN system 104 the ability to be aware of a common source (i.e., a particular source ID) of traffic without knowing the "internal" source enterprise network address that originated the traffic 124, as that data (e.g., IP headers of traffic 124) can be "stripped" by the TTS 116 and thus, not passed on as part of traffic 132 to the TGS 120. Accordingly, the VHN system cannot infer or determine details of the enterprise network 102A such as the layout/architecture of the network based upon, for example, examining the source enterprise network address utilized by the source of the traffic 124.

Further, some embodiments can utilize engagement techniques to observe an attacker 106, learn attack vectors and methods, and/or keep the attacker 106 busy to allow additional time for the impacted enterprise network 102A to identify the attacker 106, identify the involved electronic devices 117, and/or further secure the network.

Accordingly, some embodiments include an engagement module ("EM") 174 as part of the VHN system 104. The TMM 142, upon detecting a usage of a token in traffic, can be configured to cause an engagement mode of operation to begin for the attacker by, for example, sending alert data 175 (which can be the same or different than token data 164) to the engagement module 174. This entry of the engagement mode can occur based upon the TMM 142 determining that an engagement condition (as part of the rules/logic of the TMM 142) is satisfied with regard to an attacker 106 and/or connections of the attacker 106. As described earlier, in some embodiments the VHN system 104 may only know a source ID (and not a source enterprise network address of the originating device) and thus, can cause one or more connections with traffic having that same source ID into engagement mode.

The engagement condition can be configured by the implementer to cause particular scenarios to result in engagement occurring. For example, upon the detection of a particular token 130A, the detection of a number of types of requests of a connection, or a particular data value appearing in traffic 138—such as a particular request to access a particular file or perform a particular function—operation can be shifted into the engagement mode.

In some embodiments, entering into the engagement mode can include causing the TGS 120 to send traffic from that source (i.e., the electronic device 117 sending the payload 125 on behalf of the attacker 106) to a different trap server that is configured as an engagement server 190.

For example, in some embodiments, the TMM 142 may instruct the TGS 120 to terminate one or more existing connections involving a particular source ID, and for any new connections arriving from that source ID, send those connections to particular engagement server(s) 190.

The engagement server 190 acts similar to a standard trap server, although it is configured to allow an operator 181 to more closely monitor its connections (e.g., in real-time or substantially real time) and perhaps further allow the operator 181 to control/define what data is returned from the engagement server 190 in real or substantially-real time. For example, as illustrated that EM 174 (or the engagement server 190 directly) can provide engagement data 176 to an operator 181, and the operator can thereby issue engagement actions 177 (via the EM 174 or directly to the engagement server 190) to cause the engagement server 190 to act according to the operator's wishes, e.g., respond with particular messages, data values, etc. This can allow the operator 181 to gain insight into the attack methods/vectors being utilized, allow the operator 181 to tempt the attacker 106 into certain traps or reveal further information, slow down the attacker by providing mis-information or encouraging the attacker to pursue other tempting but false leads, etc.

As alluded to elsewhere herein, different embodiments can provide different benefits (or combinations of benefits). In some embodiments, there is not a limitation upon the number or type of supported protocols, as the TTS 116 can be oblivious to the syntax and semantics of the protocol used for communicating tokens to the trap servers. Additionally, adding support for a new protocol can include performing a simple configuration change in the TTS 116 (e.g., an opening of another port). Thus, in some embodiments, protocol-specific components—be it a specialized trap server 152 (e.g., a FTP server) or a module to extract the token from the protocol (e.g., an FTP protocol parser or an FTP log parser) can be implemented in the VHN 104 without intruding into an enterprise network.

In some embodiments, the attack/intrusion detection algorithms are implemented and deployed in the "cloud" (e.g., in a cloud network 170), and hence, these algorithms can be added, modified, tested, etc., without impacting an on-premise (i.e., within an enterprise network) device.

Moreover, some embodiments have a comparatively minimal on-premise deployment requirement. For example, the TTS 116 can be a simple software package that can be installed on hardware provided by the enterprise/customer, delivered as a virtual machine (VM) to be deployed by the customer on a private cloud, etc. Once deployed, relatively straightforward internal DNS configuration changes can make the TTS 116 "visible" by name (or names) to end stations within the enterprise.

In some embodiments, the on-premise deployment can provide immediate and quick protection for enterprises that do not have a network monitoring system deployed in their network, and can allow enterprises having only limited network monitoring deployments (e.g., a database activity monitor only) to gain advanced multi-protocol protection mechanisms while avoiding the need to install and maintain large numbers of new, complex components (such as additional network monitoring systems, additional honeypot servers, etc.) within the enterprise.

Further, token access data can be available for additional investigation in the cloud, enabling crowd-sourcing techniques and faster improvement cycles of the VHN system. For example, certain attack vectors/patterns can be determined from observing an attacker within a first enterprise network, and protections can be identified and deployed into other enterprise networks before those networks even see such attacks.

In some embodiments, the trap server services provided by the VHN system can easily be customized for each enterprise. When a compromise is detected through the detection algorithms, a response to the original end-station can be constructed to indicate successful compromise and entice further access by the attacker, through the TTS 116 to the VHN 104. This further access can be routed by the TGS 120 to a separate portion of the cloud network 170 in which security operators on duty can respond intelligently to attacker's requests and keep the attacker engaged for further analysis of origin and attribution (e.g., using engagement mode).

Figure 2:
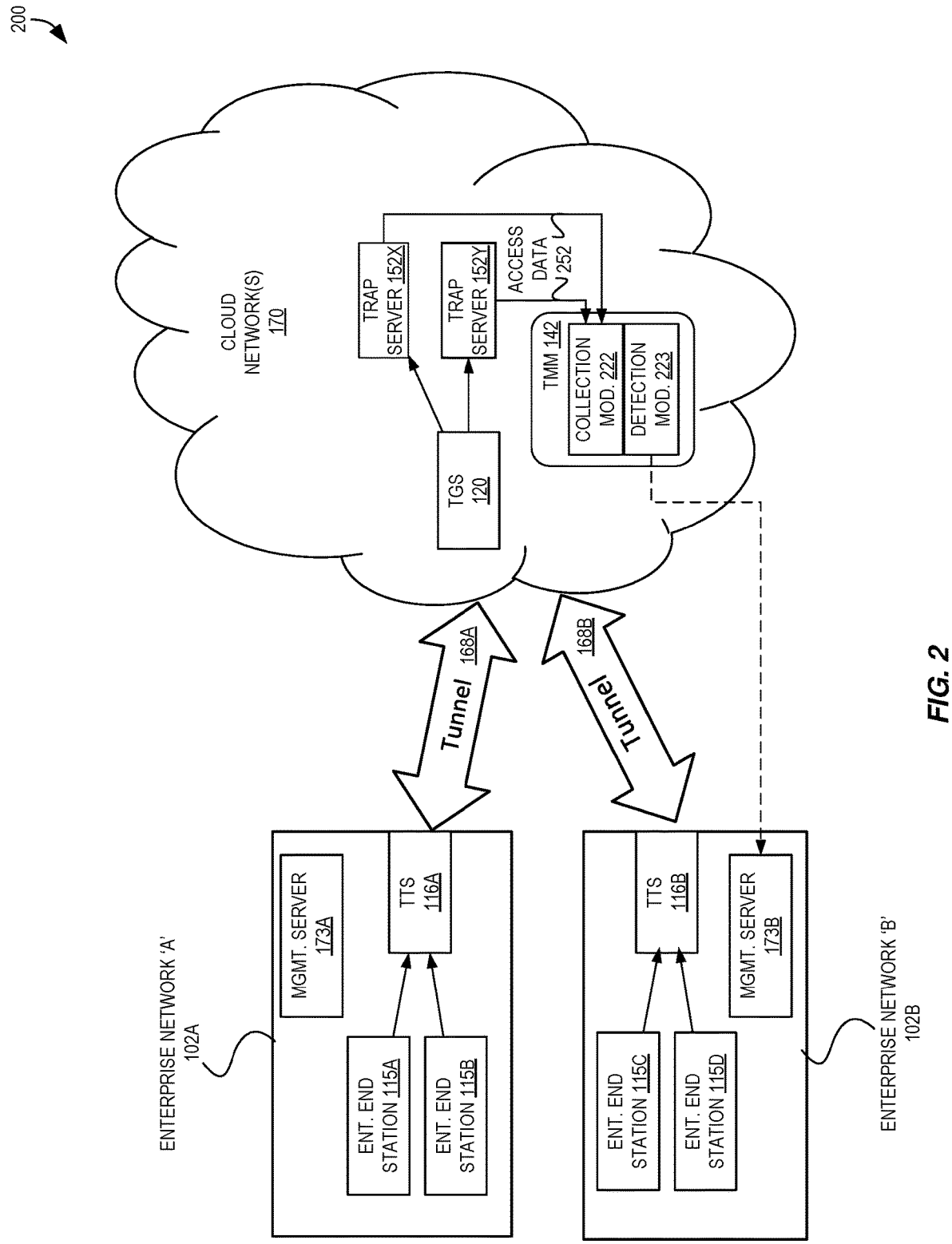
FIG. 2 is a high-level block diagram illustrating additional aspects of an exemplary system for securely detecting compromises of enterprise end stations using tunnel tokens according to some embodiments.

FIG. 2 is a high-level block diagram illustrating additional aspects of an exemplary system 200 for securely detecting compromises of enterprise end stations using tunnel tokens according to some embodiments.

As illustrated in this figure, in some embodiments the tunneled tokens solution can be constructed with two parts: an enterprise network 102A and the cloud network 170. In the client network 102A, one or more endpoints (e.g., enterprise end stations 115A-115B) have tokens that "point" to a private enterprise network address utilized by the TTS 116. When a token is touched or utilized, the relevant payload (and perhaps additional data as described above) is transferred through a (secured) tunnel 168A to the cloud network 170; specifically to the TGS 120. The TGS 120 can decide which trap server 152 it should pass the payload to, and the TMM 142 can collect (e.g., using collection module 222) and analyze (e.g., using detection module 223) this traffic (e.g., as access data 252) to detect an attack/intrusion.

This illustrated system 200 includes two different "clients" (e.g., enterprises, organizations, etc.) having two different client networks 102A-102B. In some embodiments, one or more entities of the VHN system 104 may be shared (e.g., by multiple clients), though this is not strictly required as described/illustrated later herein with regard to subsequent figures.

In some embodiments, each trap server 152A-152N can deal with the connection from the client's endpoint on its own (i.e., without needing to connect to other components), as all connections can be provided to the trap server decrypted and ready to process. However, in some embodiments, additional information can be provided to the trap server, including but not limited to domain information about the end-user initiating the connection, or other enterprise-specific information, such as the "additional data" described above as including one or more identifiers generated/inserted by the TTS. This additional data can be used to treat different users in different ways (e.g., showing a different file list to users from different departments, showing different data to different users of different enterprises, etc.). This can result in more "believable" trap servers 152 from the standpoint of the attacker, and can lead to the attacker continuing to interact with the trap servers instead of finding only useless data or obviously fake data.

In some embodiments, the TMM 142 can be implemented as part of a SecureSphere appliance from Imperva Inc., such as the SecureSphere MX Management Server and/or a SecureSphere Network Gateway.

The collection module 222 can be deployed in the VHN (e.g., in/as a virtual machine). It can be connected to each of the trap servers 152C-152D and receive access data from them. This can occur using a variety of techniques, such as through an installed agent on each trap server that reports this data, acquiring packet capture ("pcap") data, etc. The collection module 222 can store the map between each connection to trap server to its client ID and/or source ID.

The detection module 223 can utilize the collected data, and can be deployed on the same (or different) virtual (or physical) machine as the collection module 222. It can run the desired algorithms using the data to produce alerts. All processing and alerts can use the client ID and/or source ID, while not being aware of any internal IP addresses used by the enterprises.

Alerts can be shown either by access (for example, via web) to an interface of the detection module from the client network, and/or processed alert data can pushed (e.g., through another independent secured tunnel) to an entity (e.g., management server 173) in the enterprise network using an Application Programming Interface (API) (e.g., a known format, such as syslog, or dedicated format) or by storing the data to a particular internal or external storage location that can similarly be accessed by the management server 173. In any case, alerts shown to user may be "decrypted" (i.e., the actual internal IP addresses can be shown), and therefore, the source ID obfuscation/transformation scheme can be "reversed" on premise (or under the direction of the enterprise, such as by a third-party that may be unaware of what is occurring, what the data means, etc.).

Figure 3:
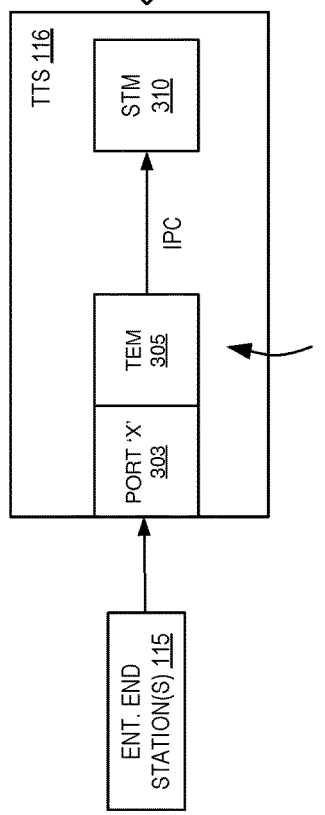
FIG. 3 is a block diagram illustrating aspects of a token tunnel server that can be useful for implementing techniques for securely detecting compromises of enterprise end stations using tunnel tokens according to some embodiments.

FIG. 3 is a block diagram illustrating aspects of a TTS 116 that can be useful for implementing techniques for securely detecting compromises of enterprise end stations using tunnel tokens according to some embodiments. The TTS 116 can be installed, in some embodiments, as a virtual machine or physical end station inside the client's network. The TTS 116 can be configured to listen using one or more "local" IP addresses (i.e., private network address(es) 118). Some or all of these addresses 118 may also be known inside the internal network by one or more host names (through some name resolution mechanism—DNS or Windows Internet Name Service (WINS), for example). The TTS 116 can be configured to have outbound access to the Internet. Tokens distributed to enterprise end stations 115 (e.g., client end station 110) in the network may reference the TTS 116, such as through one of its internal IP addresses, via one of its host names, etc. In some embodiments, the use of multiple private network addresses 118 for a TTS 116 can prevent a scenario where too many services point to the same IP address, which is likely to raise suspicion with an attacker.

In the TTS 116, a Tunnel Entry Module ("TEM") 305 can be configured to listen for incoming connections on one or more ports 303 on the one or more internal IP addresses of the TTS 116. The list of ports can be configurable to match the multitude of tokens and token types distributed to end stations (e.g., if file tokens are distributed, then TEM can listen on port 445 for the CIFS protocol; if web tokens are distributed, then TEM can listen on port 80 for the HTTP protocol, etc.). When the TEM 305 picks up a new incoming TCP connection on a port 'X' 303 (the original connection) it can transfer the data by an Inter Process Communication (IPC) mechanism to the Secure Tunnel Module ("STM") 310, which is used for establishing TCP connections between the TTS 116 and the VHN 104. However, in other embodiments, the TEM 305 and STM 310 may use other communications techniques, such as the use of network traffic, which may be useful when these modules are not implemented by a single computing device.

In some embodiments, the TEM 305 can be configured to insert additional data 167 (e.g., TCP payload data) at the beginning of the internal TCP connection data to include a source ID (e.g., a unique endpoint identifier) that represents the source IP address of the original connection. This source ID can be used in order to keep information about the internal network addresses from "leaking" into the VHN 104. In such embodiments, the VHN 104 knows each customer end station only by its source ID, and reports any incidents using its source ID. The source ID can be randomly generated per source IP address, a computed cryptographic digest of the source IP address, etc., and the STM 310 may maintain a mapping or translation table (between the source IP address and source ID). The source ID can also be an encrypted representation of the IP address, in which case a mapping table might not be used.

The additional data 167 may also contain a unique customer ID and/or may contain, as a protocol ID, the number of the original destination port ("port X").

Once the two connections are established (i.e., the one coming from the enterprise end station 115A and the one going through the tunnel 168C through the STM 310), the TEM 305 can take payloads received on one connection and send them through the other connection (perhaps along with additional data, resulting in data 165) and vice versa. The payload data, though, can be sent without modifications, and therefore, there may be no limitations on the number or type of supported protocols. In some embodiments, the connection passing through the Internet—i.e., the tunnel 168—is secured/encrypted.

The STM 310 can work in multiple different approaches. For example, in some embodiments, a new TCP tunnel can be created for each incoming connection. Alternatively, in some embodiments, a single tunnel is created between the TTS and the VHN, and all connection data is passed through it.

In the first option, the destination port can be configured to match the original destination port or it can be replaced with a single arbitrary destination port, assuming that the original destination port is inserted before the actual payload (together with the source ID). In the second option, where a standard multiplexing tunnel to the VHN such as a GRE tunnel or an Secure Sockets Layer (SSL) VPN tunnel is utilized, per each connection received from the STM, the TEM can create a TCP connection to a dedicated IP address that is routed into the tunnel between the TEM and the VHN. In this option, the original destination port can be inserted into the traffic with the source ID. Either way, the tunnel can be encrypted or not, and the STM 310 can encrypt the data by itself, depending on the used type of tunnel.

Figure 4:
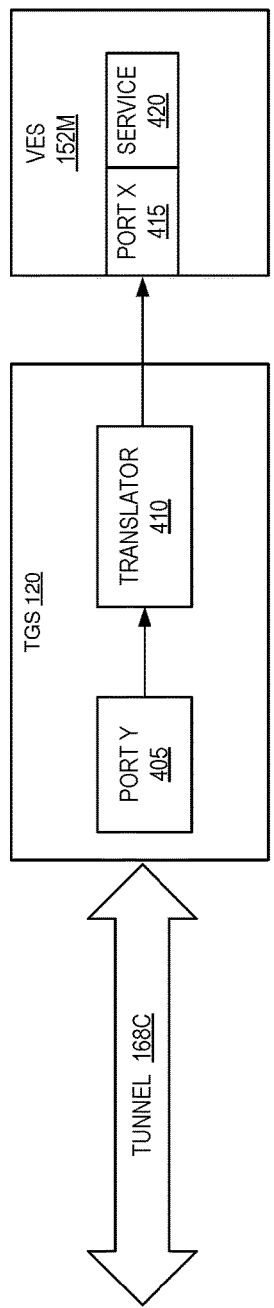
FIG. 4 is a block diagram illustrating aspects of a tunnel gateway server that can be useful for implementing techniques for securely detecting compromises of enterprise end stations using tunnel tokens according to some embodiments.

FIG. 4 is a block diagram illustrating aspects of a TGS 120 that can be useful for implementing techniques for securely detecting compromises of enterprise end stations using tunnel tokens according to some embodiments.

In some embodiments, the TGS 120 receives TCP connections from client networks through a tunnel 168C at a port "Y" 405 and creates matching TCP connections to trap servers 152 inside the VHN system. For each incoming connection, the TGS can extract the additional data 167, which can include the source ID (and possibly other identifiers as described above), and then create a TCP connection to an appropriate trap server 152M using the appropriate protocol based on, for example, the destination port of the original connection (e.g. if the original connection had destination port 80 then the internal connection will be to port 80 as well) or the port number extracted from the additional data 167 (assuming that all incoming connections have the same destination port), though other techniques may be utilized as described herein. The TGS 120 can remove any encryption introduced by the STM 310 (aside from any that might be used to create the source ID). The TGS 120 can take (decrypted) payload data from the incoming connection and send it over the internal connection to the trap server (and vice versa). The trap server can be chosen based on the involved protocol, the source ID, the client ID, etc.

The TGS 120 can maintain a record for each internal connection to the utilized trap server 152 (which can be identified by the connection source port), which can include the source ID and/or client ID. Accordingly, any token usage detected over this connection can be correctly attributed to a specific end station within a specific customer/enterprise network via the source ID and/or client ID. The client ID may be explicitly extracted from the additional data 167 of an incoming connection, established for all connections coming through a single tunnel based on the authentication phase of tunnel creation, etc.

In some embodiments, the TGS 120 includes a translator module 410 that is responsible to change the original TCP stream, if needed. For example, the stream may need to be modified if the original connection is based on a Kerberos ticket that can only be opened with a key from the client's domain. In this case, the system sends the domain key from the TTS in the client's domain at first startup configuration, and uses it in the translator module 410. Another example, in some embodiments, includes sending different parameters in the protocol based on the source ID and/or client ID, such as different HTTP parameters.

In some embodiments, the additional data added to the TCP stream (by the TTS 116) can be added to the encrypted tunneled data, therefore, no knowledge of the client internal network is leaked to attackers who can view/manipulate this traffic.

Some embodiments provide support for multiple clients. In some such embodiments, in order to allow multiple clients to use the same cloud network for the tunnel tokens solution, a client ID can be added for each new TCP connection. When the TCP stream arrives to the TGS 120, different clients can be flexibly redirected to different trap servers, therefore, not exposing private data to other clients.

The techniques described herein can be used in a single client environment or in a multiple-client environment. To accommodate multiple clients, several approaches can be used to scale the tunnel tokens service while retaining separation between clients (e.g., for maintaining privacy between enterprises).

For example, FIG. 5 is a block diagram illustrating a dedicated configuration 500 providing client isolation via dedicated resources to implement the secure detection of compromises of enterprise end stations using tunnel tokens according to some embodiments.

In this configuration, the VHN system 104 can instantiate a dedicated TGS 120A and one or more dedicated trap servers 152A-152F for each enterprise (or enterprise network 102A, of which there may be one or more per enterprise). Thus, a second enterprise network (of a same or different enterprise) will communicate with a different TGS 120N and one or more different trap servers 152K-152P.

This configuration 500 can provide the most security between enterprises, as all enterprise data flowing from an enterprise network 102A will flow to/through dedicated resources that are only utilized for that enterprise network 102A. Thus, there is little to no risk of any enterprise data from one enterprise comingling with enterprise data from another enterprise. Moreover, this configuration 500 can be comparatively easy to implement, as additional instances of TGSs 120 and trap servers 152 can be launched and/or taken down for each enterprise. However, this configuration 500 may have the most resource requirements, as having multiple instances of these entities requires dedicated resources for each.

Another configuration is illustrated in FIG. 6, which is a block diagram illustrating a shared configuration 600 providing client isolation utilizing multiple interfaces to implement the secure detection of compromises of enterprise end stations using tunnel tokens according to some embodiments. In some embodiments utilizing this configuration, a number of interfaces are created and traffic from each enterprise can be referred to one or more of these unique interfaces. Thus, one instance of a type of trap server 152A can be instantiated and utilized by multiple different enterprises.

As one deployment specific example, a new file server (or any other server type) can be configured for each interface with different directories. Each file share can be configured on a different IP address, so they correspond to different servers, leading to different alerts for each client. In the file server itself, the traffic can be recorded separately for each interface, and therefore, the data of two enterprises is not stored in the same file. This approach can, for example, save (virtual server) resources through some sharing of resources—i.e., sharing instances of trap servers between multiple enterprises.

Yet another approach is shown in FIG. 7, which is a block diagram illustrating a shared configuration 700 providing client isolation utilizing dedicated trap servers to implement the secure detection of compromises of enterprise end stations using tunnel tokens according to some embodiments. In this illustrated example, a single TGS 120N is utilized; however, the trap servers (e.g., a services file representing, for example, a file server) can be separated into different servers (e.g., virtual machines) for each client/enterprise. In some embodiments, rules can be added to the VHN system to block any accesses from one trap server to another (e.g., using security groups), and thus, the files/data on each server are only visible to only one client.

FIG. 8 is a flow diagram illustrating operations of a flow 800 that can be performed by a TTS as part of implementing the secure detection of compromises of enterprise end stations using tunnel tokens according to some embodiments.

The operations in the flow diagrams will be described with reference to the exemplary embodiments of the other figures. However, it should be understood that the operations of the flow diagrams can be performed by embodiments other than those discussed with reference to the other figures, and the embodiments of the invention discussed with reference to these other figures can perform operations different than those discussed with reference to the flow diagrams.

At block 805, the flow 800 includes receiving a first set of one or more packets from a source enterprise network address that are directed to a destination enterprise network address of the enterprise network. In some embodiments, the first set of packets are received at a first server that is within an enterprise network and that is implemented by one or more electronic devices. The first server may be, for example, a TTS 116 as described herein. The destination enterprise network address is an enterprise network address assigned to the first server, and the first set of packets includes data comprising a token. The token was placed upon an enterprise end station within the enterprise network and appears to be useful for accessing the first server or a resource provided by the first server.

At block 810, the flow 800 includes transmitting a second set of one or more packets via a tunnel across a public network to a second server that is outside of the enterprise network. In some embodiments, the second server is a TGS 120 as described herein. The second set of packets includes the data and an identifier, but does not include the source enterprise network address, so that the source enterprise network address is not disclosed to the second server. The second set of packets causes the second server to send the data to a third server that acts as if it were an enterprise server within the enterprise network but is actually outside of the enterprise network and does not store enterprise data. The third server can be a trap server as described herein. The presence of the token in the second set of packets allows for determining whether one of the enterprise end stations has been compromised. At least one of the enterprise end station or the source enterprise network address can be determined, within the enterprise, based upon the identifier. Outside the enterprise, the identifier distinguishes between traffic sent from different source enterprise network addresses without disclosing the different source enterprise network address itself.

In some embodiments, block 810 includes block 815, and determining the identifier. In some embodiments, the identifier is a source identifier associated with the source enterprise network address.

In some embodiments, block 815 includes generating the identifier based upon the source enterprise network address, which can include block 825 and applying an obfuscation algorithm using at least some of the source enterprise network address. The obfuscation algorithm can proscribe a series of data transformations to be performed using the source enterprise network address to yield the identifier. In some embodiments, block 825 includes block 830, where the obfuscation algorithm includes encrypting some or all of the source enterprise network address to yield the identifier.

In some embodiments, block 815 includes block 835 and performing a lookup to select the identifier using the source enterprise network address. Block 835 can be performed, for example, when an identifier has previously been generated, and the identifier may be stored in a mapping data structure (e.g., table) as associated with the source enterprise network address.

In some embodiments, block 810 includes block 840, where the second set of packets further includes a client identifier associated with the enterprise, which may be added by the first server.

The flow may continue to blocks 845 and 850, in which at block 845 the flow includes receiving a third set of one or more packets carrying response data that was generated by the third server based at least in part upon the data of the second set of packets. The third set of packets does not include the source enterprise network address. At block 850, the flow can include transmitting a fourth set of one or more packets carrying the response data generated by the third server to the source enterprise network address. The first server determined the source enterprise network address to be used as a destination for the fourth set of packets, and this determination can be based upon utilizing a source identifier from within the third set of packets, and can include using the source identifier to look up the source enterprise network address.

Figure 9:
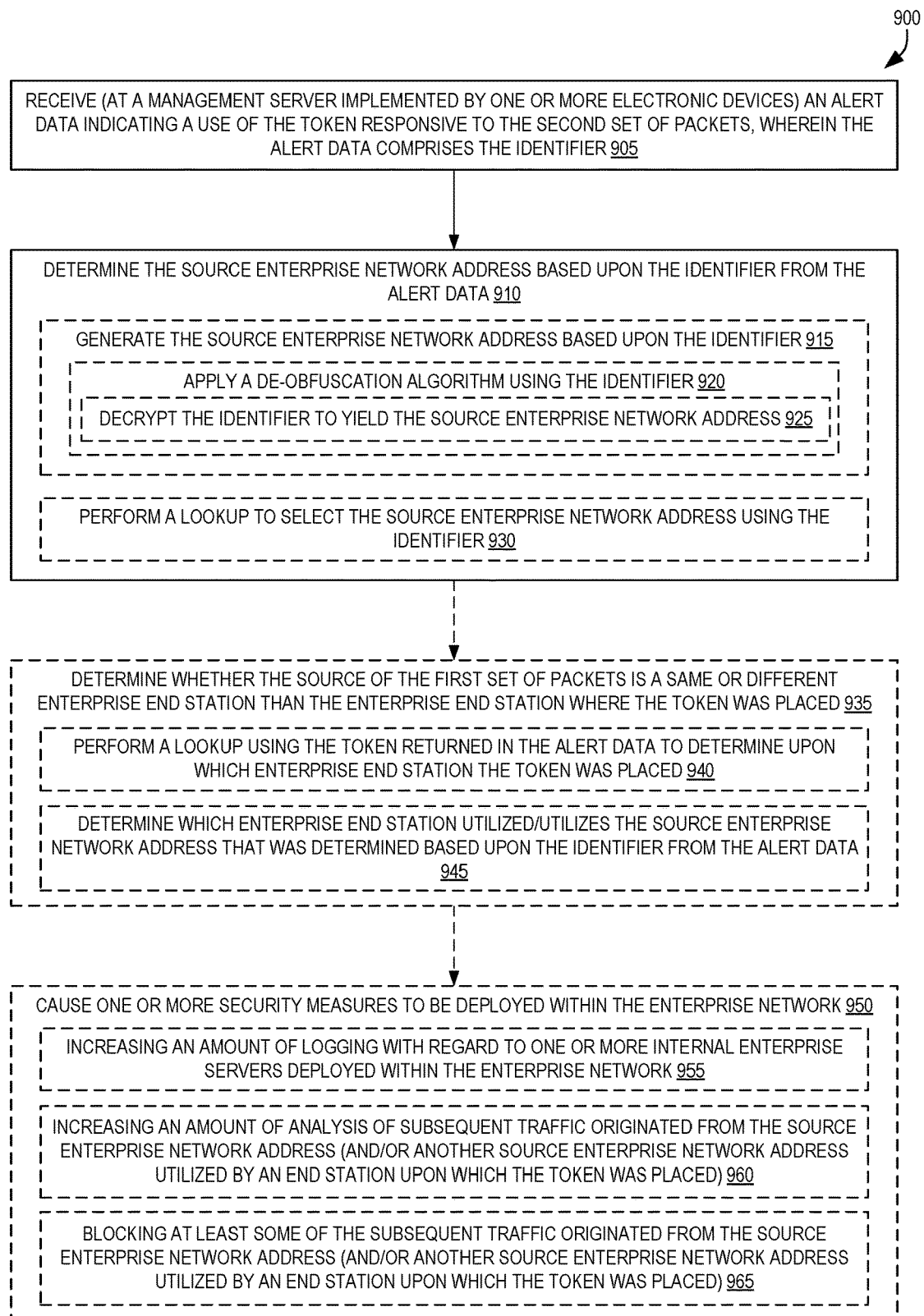
FIG. 9 is a flow diagram illustrating operations of a flow that can be performed by a management server as part of implementing the secure detection of compromises of enterprise end stations using tunnel tokens according to some embodiments.

In some embodiments, the flow 800 may continue to 905 of FIG. 9. FIG. 9 is a flow diagram illustrating operations of a flow 900 that can be performed by a management server as part of implementing the secure detection of compromises of enterprise end stations using tunnel tokens according to some embodiments.

Flow 900 can include block 905, where an alert data is received (e.g., at a management server implemented by one or more electronic devices) indicating a use of the token responsive to the second set of packets. The alert data comprises the identifier.

At block 910, the flow 900 includes determining the source enterprise network address based upon the identifier from the alert data. Block 910 can include, for example, block 915 and generating the source enterprise network address based upon the identifier itself. Block 915 can include block 920 and applying a de-obfuscation algorithm using the identifier. The de-obfuscation algorithm can be, for example, a function that is the inverse of the obfuscation algorithm of block 825 in FIG. 8. Block 920 can include, in some embodiments, decrypting the identifier to yield the source enterprise network address.

In some embodiments, block 910 can include block 930, and performing a lookup (e.g., in a mapping data structure) to select the source enterprise network address using the identifier. In some embodiments, the data of the mapping data structure can be received from the TTS 116 disclosed herein.

Optionally, at block 935, the flow 900 includes determining whether the source of the first set of packets is a same or a different enterprise end station than the enterprise end station where the token was placed. Block 935 can include, in some embodiments, block 940 and performing a lookup using the token returned in the alert data to determine which enterprise end station the token was placed upon. In some embodiments, block 935 includes determining which enterprise end station utilized (or currently utilizes) the source enterprise network address that was determined based upon the identifier from the alert data in block 940.

Optionally, at block 950, the flow 900 includes causing one or more security measures to be deployed within the enterprise network. Block 950 can include one or more of blocks 955, 960, and/or 965.

Block 955 includes increasing an amount of logging with regard to one or more internal enterprise servers deployed within the enterprise network. Block 960 includes increasing an amount of analysis of subsequent traffic originated from the source enterprise network address (and/or another source enterprise network address utilized by an end station upon which the token was placed). Block 965 includes blocking at least some of the subsequent traffic originated from the source enterprise network address (and/or another source enterprise network address utilized by an end station upon which the token was placed).

Figure 10:
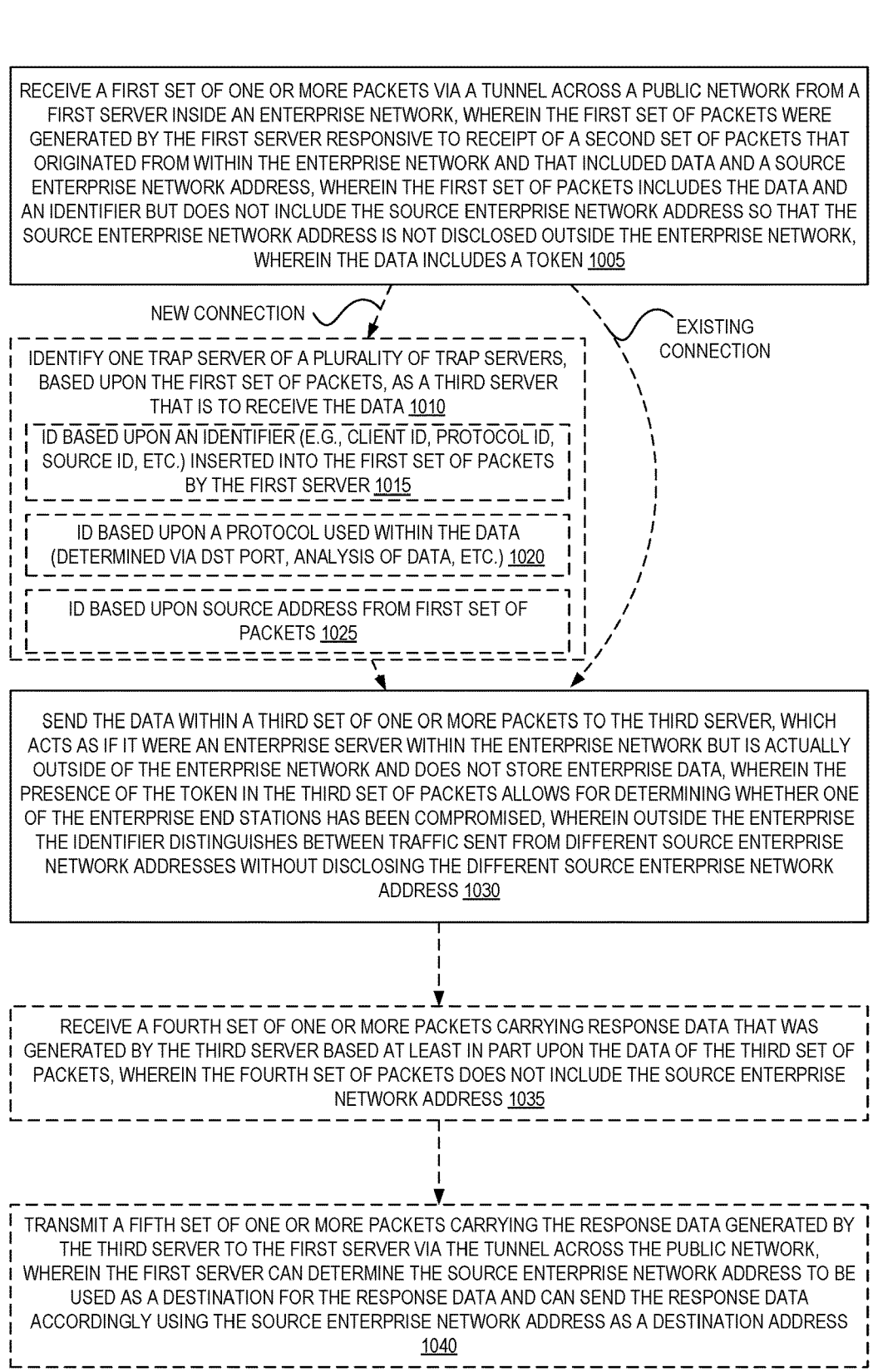
FIG. 10 is a flow diagram illustrating operations of a flow that can be performed by a TGS as part of implementing the secure detection of compromises of enterprise end stations using tunnel tokens according to some embodiments.

FIG. 10 is a flow diagram illustrating operations of a flow 1000 that can be performed by a TGS 120 as part of implementing the secure detection of compromises of enterprise end stations using tunnel tokens according to some embodiments.

Flow 1000 can include block 1005, and receiving a first set of one or more packets via a tunnel across a public network from a first server inside an enterprise network. The first set of packets were generated by the first server responsive to receipt of a second set of packets that originated from within the enterprise network and that included data and a source enterprise network address. The first set of packets, however, includes the data and an identifier but does not include the source enterprise network address so that the source enterprise network address is not disclosed outside the enterprise network. The data includes a token.

When the first set of packets are part of an existing connection, the flow can continue with block 1030. However, when the first set of packets are not part of an existing connection—and thus, are forming a new connection—the flow can continue to block 1010, and identifying one trap server of a plurality of trap servers, based upon the first set of packets, as a third server that is to receive the data. Block 1010 can include block 1015, where the identification is based upon an identifier (e.g., client ID, protocol ID, source ID, etc.) inserted into the first set of packets by the first server. Block 1010 can include block 1020, where the identification is based upon a protocol used within the data, which can be determined based upon a destination port utilized, an analysis of payload data, and/or a protocol ID. Block 1010 can include block 1025, where the identification is based upon a source address from the first set of packets, such as when certain trap servers are associated with a particular enterprise using that source address.

At block 1030, the flow 1000 can include sending the data within a third set of one or more packets to the third server. The third server acts as if it were an enterprise server within the enterprise network but is actually outside of the enterprise network and does not store enterprise data. The presence of the token in the third set of packets allows for determining whether one of the enterprise end stations has been compromised. Outside the enterprise, though, the identifier distinguishes between traffic sent from different source enterprise network addresses without disclosing the different source enterprise network address.

Optionally, the flow 1000 can include block 1035, and receiving a fourth set of one or more packets carrying response data that was generated by the third server based at least in part upon the data of the third set of packets. The fourth set of packets does not include the source enterprise network address.

Optionally, the flow 1000 can include block 1040, and transmitting a fifth set of one or more packets carrying the response data generated by the third server to the first server via the tunnel across the public network. The first server can determine the source enterprise network address to be used as a destination for the response data, and can send the response data accordingly using the source enterprise network address as a destination address.

FIG. 11 is a flow diagram illustrating operations of a flow 1100 that can be performed by a TMM 142 and operations of another flow 1150 that can be performed by a TGS 120, as part of implementing the secure detection of compromises of enterprise end stations using tunnel tokens according to some embodiments.

In some embodiments, flow 1100 can include block 1105, and monitoring interactions between a client within an enterprise network and a first server (within a cloud network) that acts as if it were an enterprise server within the enterprise network but is actually outside of the enterprise network and does not store enterprise data. A request data (e.g., a payload) originated by the client passes over a first connection to a second server within the enterprise network, and further passes over a second connection between the second server and a third server that is not within the enterprise network, and further passes over a third connection between the third server and the first server.

In some embodiments, flow 1100 can include block 1110, and determining that future request data originated by the client is to be sent to a fourth server instead of the first server. The fourth server is configured to allow an operator to monitor its interactions with clients and/or allow the operator to issue commands to the fourth server to customize response data that it sends to clients. The fourth server may be, for example, a trap server 152N configured as an engagement server 190.

In some embodiments, flow 1100 can include block 1115, and determining a source identifier (and possibly, client identifier) associated with the second connection between the second server and the third server.

In some embodiments, flow 1100 can include block 1120, and providing the source identifier (and possibly, client identifier) to the third server to cause the third server to send future request data that it receives, which was originated by the client, to the fourth server instead of the first server. Block 1120, in some embodiments, includes block 1125 and providing an identifier of the fourth server to the third server, to inform the third server where the future request data should be sent.

FIG. 11 also illustrates another flow 1150, which can be performed by a TGS 120. In some embodiments, flow 1150 can include block 1155, and receiving a source identifier. In some embodiments, the source identifier is received from a TMM 142. In some embodiments, a client identifier may also be received, and in some embodiments, an identifier of the fourth server as a new destination for future traffic originated by the client may also be received.

In some embodiments, flow 1150 can include block 1160, and identifying, based upon the source identifier (and perhaps the client identifier), the second connection (and any other connection(s) sending data on behalf of the client). Flow 1150 can also include block 1165, and causing the second connection with the second server (and the other connection(s)) to be dropped, which can include dropping received one or more packets of those connections.

In some embodiments, flow 1150 can include block 1170, and receiving another one or more packets carrying additional data that was originated by the client. The another one or more packets may also include the source identifier.

In some embodiments, flow 1150 can include block 1175, and determining that the fourth server is to receive the additional data. This determination can be based upon the identifier of the fourth server and/or the client identifier and/or the source identifier, some or all of which may have been received at block 1155. Flow 1150 can include block 1180, and transmitting the additional data to the fourth server.

In various embodiments, a trap server (e.g., trap server 152A) can be any of multiple different types of servers. For example, a trap server 152A can comprise a database server, file server, web application server, print server, mail server, gaming server, application server, etc.

A web application server is system software (running on top of an operating system) executed by server hardware (e.g., a server end station) upon which one or more web applications run. Web application servers may include a web server (e.g., Apache, Microsoft® Internet Information Server (IIS), nginx, lighttpd), which delivers web pages upon the request of HTTP clients (i.e., software executing on an end station) using HTTP, and may also include an application server that executes procedures (i.e., programs, routines, scripts) of a web application. Web applications are computer software applications made up of one or more files including computer code that are executed by web application servers and are written in a language the web application server supports. Web applications are typically designed to interact with HTTP clients by dynamically generating HTML and other content responsive to HTTP request messages sent by those HTTP clients. HTTP clients typically interact with web applications by transmitting HTTP request messages to web application servers, which execute portions of web applications and return web application data in the form of HTTP response messages back to the HTTP clients, where the web application data may be rendered using a web browser. Thus, HTTP functions as a request-response protocol in a client-server computing model, where the web application servers typically act as the "server" and the HTTP clients typically act as the "client."

HTTP Resources are identified and located on a network by URIs—or, more specifically, URLs—using the HTTP or HTTP Secure (HTTPS) URI schemes. URLs are specific strings of characters that identify a particular reference available using the Internet. URLs typically contain a protocol identifier or scheme name (e.g. http/https/ftp), a colon, two slashes, and one or more of user credentials, server name, domain name, Internet Protocol (IP) address, port, resource path, query string, and fragment identifier, which may be separated by periods and/or slashes.

Database servers are computer programs that provide database services to other computer programs or computers, typically adhering to the client-server model of communication. Many web applications utilize database servers (e.g., relational databases such as PostgreSQL, MySQL, and Oracle, and/or non-relational databases such as NoSQL databases like MongoDB, Riak, Apache CouchDB, Apache Cassandra, HBase, etc.) to store information received from HTTP clients and/or information to be displayed to HTTP clients. However, other non-web applications may also utilize database servers, including but not limited to accounting software, other business software, or research software. Further, some applications allow for users to perform ad-hoc or defined queries (often using Structured Query Language (SQL)) using the database server. Database servers typically store data using one or more databases, each including one or more tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column. Thus, in some instances a database server will receive a SQL query from a client (directly from a client process or client end station using a database protocol, or indirectly via a web application server that a client is interacting with), execute the SQL query using data stored in the set of one or more database tables of one or more of the databases, and potentially return a result (e.g., an indication of success, a value, one or more tuples, etc.).

A file server is system software (e.g., running on top of an operating system, or as part of an operating system itself) typically executed by one or more server end stations (each coupled to or including one or more storage devices) that allows applications or client end stations access to a filesystem and/or files, typically allowing for the opening of files, reading of files, writing to files, and/or closing of files over a network. Further, while some file servers provide file-level access to storage, other file servers may provide block-level access to storage. File servers typically operate using any number of remote file-system access protocols, which allow client processes to access and/or manipulate remote files from across the Internet or within a same enterprise network (e.g., a corporate Intranet). Examples of remote file-system access protocols include, but are not limited to, the Network File System (NFS), WebNFS, Server Message Block (SMB)/Common Internet File System (CIFS), File Transfer Protocol (FTP), Web Distributed Authoring and Versioning (WebDAV), Apple Filing Protocol (AFP), Remote File System (RFS), etc. Another type of remote-file system access protocol is provided by Microsoft Sharepoint™, which is a web application platform providing content management and document and file management.

Client end stations 110 (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes) are computing devices operable to execute applications that, among other functions, can access the content (e.g., enterprise data) and/or services provided by server end stations (or the trap servers 152A-152N described herein). In some embodiments, the client end stations execute applications to allow a user to create, delete, view, and/or edit user data files stored locally (i.e., within that client end station).

An enterprise is a business, organization, group, governmental body, or other collective body. Some users of the client end stations 110 are deemed enterprise users or authorized users, which are those users explicitly or implicitly part of the enterprise or acting under the permission of the enterprise. Authorized users, using client end stations 110, typically access the content (e.g., enterprise data) and/or services of server end stations 112 from within a same LAN (or enterprise network 102A) as the server end stations 112, or when the client end stations 112 are connected to the LAN through use of virtual private network (VPN) connections to the LAN overlaid on (e.g., tunneled through) the Internet (e.g., via remote access gateway 114). In some embodiments, though, one or more of the server end stations 112 may be configured to be directly accessible from outside the LAN.

As detailed above, intrusions into an enterprise network may seek access to enterprise data 123A provided by server end stations 112 implementing internal enterprise servers 122A. Such intrusions may occur through a compromised client end station (e.g., 110) assigned to one or more authorized users that has been accessed or controlled by an intruder/attacker 106. In some instances, the intruder 106 may have direct, physical access to the client end station 110, but in other instances, the intruder 106 may be able to connect to the client end station 110 from a separate client end station 108 existing either inside or outside the enterprise network. For example, the intruder 106 may be granted access to the client end station 110 when an authorized user accesses a malicious webpage (via the client end station 110) causing a malicious program or code (i.e., "malware") to be executed by the client end station 110. For example, the authorized user, using a web browser of the client end station 110, may load a web page hosting an "exploit kit" that subjects the client end station 110 to one or more attacks (attempting to install malware) against the web browser or other software that the web browser can invoke, such as a third party document viewer or multimedia player, or may attempt to lure the authorized user into surreptitiously allowing or causing the malware to be installed to the client end station 110. With access to the compromised client end station 110, the attacker/intruder 106 may then attempt to access enterprise data of the enterprise using information and/or credentials granted to the client end station or authorized user that is stored on the client end station—notably, this can include the tokens 130, which lead the attacker/intruder to the trap servers 152 utilizing techniques as described herein.

The modules described herein, in various embodiments, may be implemented with software, hardware, or a combination of bot, and may be implemented in a variety of configurations, including implementing each module using a separate electronic device or combining some of the modules on just one electronic device.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a cloud network to detect compromises of enterprise end stations within an enterprise network based on tokens tunneled outside of the enterprise network to the cloud network, comprising:
   receiving, at a tunnel gateway server within the cloud network that is implemented by one or more electronic devices, a first set of one or more packets via a tunnel across a public network from a first server within the enterprise network, wherein the first set of one or more packets were generated by the first server responsive to the first server receiving a second set of one or more packets that originated from within the enterprise network by an enterprise end station attempting to access the first server and that included data and a source enterprise network address, wherein the first set of one or more packets includes the data and an identifier but does not include the source enterprise network address so that the source enterprise network address is not disclosed outside of the enterprise network, wherein the data includes a token;
   transmitting, by the tunnel gateway server, the data within a third set of one or more packets to a second server that acts as if it were an enterprise server within the enterprise network but is actually outside of the enterprise network and does not store enterprise data, wherein outside of the enterprise the identifier distinguishes between traffic transmitted from different source enterprise network addresses without disclosing the different source enterprise network addresses;
   monitoring, by a traffic monitoring module within the cloud network that is implemented by one or more electronic devices, traffic transmitted to the second server, including the third set of one or more packets transmitted to the second server; and
   providing, by the traffic monitoring module, alert data to the enterprise network in response to detecting, based on the monitoring, use of the token in the third set of one or more packets.

2. The method of claim 1, further comprising:
   identifying, by the tunnel gateway server, one trap server of a plurality of trap servers, based on the first set of one or more packets, to be the second server to which the data is transmitted.

3. The method of claim 2, wherein the identification of the one trap server to be the second server is based on a client identifier included within the first set of one or more packets.

4. The method of claim 2, wherein the identification of the one trap server to be the second server is based on a protocol used within the data.

5. The method of claim 2, wherein the identification of the one trap server to be the second server is based on a source address of the first set of one or more packets.

6. The method of claim 1, further comprising:
   receiving, at the tunnel gateway server, a fourth set of one or more packets carrying response data that was generated by the second server based at least in part on the data included within the third set of one or more packets, wherein the fourth set of one or more packets does not include the source enterprise network address.

7. The method of claim 6, further comprising:
   transmitting, by the tunnel gateway server, a fifth set of one or more packets carrying the response data that was generated by the second server to the first server via the tunnel across the public network, wherein the first server can determine the source enterprise network address to be used as a destination for the response data and can transmit the response data accordingly using the source enterprise network address as a destination address.

8. The method of claim 1, wherein the token was placed upon the enterprise end station, wherein the token appears to be useful for accessing the first server or a resource provided by the first server.

9. The method of claim 1, wherein the providing the alert data to the enterprise network causes one or more security measures to be deployed in the enterprise network that monitor or block traffic, increase an amount of logging or monitoring, or notify a particular enterprise user.

10. The method of claim 1, wherein the identifier is an encrypted version of the source enterprise network address.

11. The method of claim 1, wherein the first set of one or more packets utilizes, as a source Internet Protocol (IP) address, a routable IP address that is different than the source enterprise network address.

12. A non-transitory computer-readable storage medium having stored therein instructions which, when executed by one or more processors of one or more devices in a cloud network to detect compromises of enterprise end stations within an enterprise network based on tokens tunneled outside of the enterprise network to the cloud network by performing operations comprising:
   receiving a first set of one or more packets via a tunnel across a public network from a first server within the enterprise network, wherein the first set of one or more packets were generated by the first server responsive to the first server receiving a second set of one or more packets that originated from within the enterprise network by an enterprise end station attempting to access the first server and that included data and a source enterprise network address, wherein the first set of one or more packets includes the data and an identifier but does not include the source enterprise network address so that the source enterprise network address is not disclosed outside of the enterprise network, wherein the data includes a token;
   transmitting the data within a third set of one or more packets to a second server that acts as if it were an enterprise server within the enterprise network but is actually outside of the enterprise network and does not store enterprise data, wherein outside of the enterprise the identifier distinguishes between traffic transmitted from different source enterprise network addresses without disclosing the different source enterprise network addresses;
   monitoring traffic transmitted to the second server, including the third set of one or more packets transmitted to the second server; and
   providing alert data to the enterprise network in response to detecting, based on the monitoring, use of the token in the third set of one or more packets.

13. The non-transitory computer-readable storage medium of claim 12, wherein the operations further comprise:
   identifying one trap server of a plurality of trap servers, based on the first set of one or more packets, to be the second server to which the data is transmitted.

14. The non-transitory computer-readable storage medium of claim 12, wherein the operations further comprise:
   receiving a fourth set of one or more packets carrying response data that was generated by the second server based at least in part on the data included within the third set of one or more packets, wherein the fourth set of one or more packets does not include the source enterprise network address.

15. The non-transitory computer-readable storage medium of claim 14, wherein the operations further comprise:
transmitting a fifth set of one or more packets carrying the response data that was generated by the second server to the first server via the tunnel across the public network, wherein the first server can determine the source enterprise network address to be used as a destination for the response data and can transmit the response data accordingly using the source enterprise network address as a destination address.

16. A network device to operate in a cloud network, comprising:
one or more processors; and
a non-transitory computer-readable storage medium having instructions stored therein which, when executed by the one or more processors, causes the device to detect compromises of enterprise end stations within an enterprise network based on tokens tunneled outside of the enterprise network to the cloud network by being adapted to:
receive a first set of one or more packets via a tunnel across a public network from a first server within the enterprise network, wherein the first set of one or more packets were generated by the first server responsive to the first server receiving a second set of one or more packets that originated from within the enterprise network by an enterprise end station attempting to access the first server and that included data and a source enterprise network address, wherein the first set of one or more packets includes the data and an identifier but does not include the source enterprise network address so that the source enterprise network address is not disclosed outside of the enterprise network, wherein the data includes a token,
transmit the data within a third set of one or more packets to a second server that acts as if it were an enterprise server within the enterprise network but is actually outside of the enterprise network and does not store enterprise data, wherein outside of the enterprise the identifier distinguishes between traffic transmitted from different source enterprise network addresses without disclosing the different source enterprise network addresses,
monitor traffic transmitted to the second server, including the third set of one or more packets transmitted to the second server, and
provide alert data to the enterprise network in response to detecting, based on the monitoring, use of the token in the third set of one or more packets.

17. The network device of claim 16, wherein the token was placed upon the enterprise end station, wherein the token appears to be useful for accessing the first server or a resource provided by the first server.

18. The network device of claim 16, wherein the identifier is an encrypted version of the source enterprise network address.

19. The network device of claim 16, wherein the first set of one or more packets utilizes, as a source Internet Protocol (IP) address, a routable IP address that is different than the source enterprise network address.

* * * * *